United States Patent
Zhang et al.

(10) Patent No.: US 10,911,939 B2
(45) Date of Patent: Feb. 2, 2021

(54) EMBEDDED UNIVERSAL INTEGRATED CIRCUIT CARD PROFILE MANAGEMENT METHOD AND APPARATUS

(71) Applicant: Huawei Technologies Co., Ltd., Shenzhen (CN)

(72) Inventors: Yajun Zhang, Shenzhen (CN); Linyi Gao, Berkshire (GB); Shuiping Long, Beijing (CN); Xiaobo Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/623,245

(22) PCT Filed: Jul. 28, 2017

(86) PCT No.: PCT/CN2017/094983
§ 371 (c)(1),
(2) Date: Dec. 16, 2019

(87) PCT Pub. No.: WO2018/227729
PCT Pub. Date: Dec. 20, 2018

(65) Prior Publication Data
US 2020/0374686 A1 Nov. 26, 2020

(30) Foreign Application Priority Data
Jun. 14, 2017 (CN) .......................... 2017 1 0449255

(51) Int. Cl.
*H04W 8/18* (2009.01)
*H04L 29/08* (2006.01)
*G06F 8/65* (2018.01)

(52) U.S. Cl.
CPC .............. *H04W 8/183* (2013.01); *G06F 8/65* (2013.01); *H04L 67/30* (2013.01); *H04L 67/34* (2013.01)

(58) Field of Classification Search
CPC ............ G06F 8/65; G06F 21/57; G06F 21/77; H04W 12/0023; H04W 12/06;
(Continued)

(56) References Cited

U.S. PATENT DOCUMENTS 9,942,094 B1 * 4/2018 Kovacevic ............ H04W 12/04
2002/0066792 A1 * 6/2002 Guthery ................ G06K 19/06
235/492

(Continued)

FOREIGN PATENT DOCUMENTS

CN 104703199 A 6/2015
CN 105101319 A 11/2015
(Continued)

*Primary Examiner* — Ernest G Tacsik
(74) *Attorney, Agent, or Firm* — Conley Rose, P.C.

(57) ABSTRACT

An embedded universal integrated circuit card (eUICC) profile management method and apparatus update an operating system of an eUICC include setting, by a local profile assistant (LPA), an operating system update flag, and obtaining and storing first metadata of a first profile. A profile server generates a second profile based on the operating system update flag, and generates second metadata of the second profile. The LPA configures the second metadata based on the first metadata, and activates the second profile based on the second metadata.

17 Claims, 9 Drawing Sheets

(58) Field of Classification Search
CPC .... H04W 4/60; H04W 8/183; H04L 63/0853; H04L 67/34
See application file for complete search history.

(56) References Cited

U.S. PATENT DOCUMENTS

| | | | | |
|---|---|---|---|---|
| 2004/0093592 | A1* | 5/2004 | Rao | G06F 8/65 717/168 |
| 2014/0025940 | A1* | 1/2014 | Giraud | G06F 21/51 713/2 |
| 2014/0099925 | A1* | 4/2014 | Schell | H04W 12/08 455/411 |
| 2015/0172255 | A1* | 6/2015 | Warnez | H04W 12/0023 713/168 |
| 2015/0193224 | A1* | 7/2015 | Ziat | G06F 8/65 717/172 |
| 2015/0289152 | A1* | 10/2015 | Shanmugam | H04L 43/50 455/425 |
| 2016/0007188 | A1 | 1/2016 | Wane | |
| 2016/0014594 | A1* | 1/2016 | Hans | H04W 8/183 455/558 |
| 2016/0021529 | A1 | 1/2016 | Park et al. | |
| 2016/0054989 | A1* | 2/2016 | Diebolt | H04L 63/12 717/177 |
| 2016/0286380 | A1 | 9/2016 | Long | |
| 2017/0048713 | A1 | 2/2017 | Guday et al. | |
| 2017/0109546 | A1* | 4/2017 | Nerot | G06F 21/51 |
| 2018/0082065 | A1* | 3/2018 | Liu | H04L 63/123 |
| 2018/0255451 | A1 | 9/2018 | Fan et al. | |
| 2018/0357059 | A1* | 12/2018 | Franchi | G06F 16/2365 |
| 2019/0007383 | A1* | 1/2019 | Vallieres | H04L 63/065 |
| 2019/0034186 | A1* | 1/2019 | Franchi | G06F 8/65 |
| 2019/0069171 | A1* | 2/2019 | Baldischweiler | H04W 12/06 |
| 2019/0104122 | A1* | 4/2019 | Gotze | G11C 17/146 |
| 2020/0120484 | A1* | 4/2020 | Ullah | H04W 8/183 |

FOREIGN PATENT DOCUMENTS

| | | |
|---|---|---|
| CN | 105282732 A | 1/2016 |
| CN | 105407475 A | 3/2016 |
| CN | 106713302 A | 5/2017 |
| CN | 106851621 A | 6/2017 |
| EP | 2509342 A2 | 10/2012 |
| EP | 2986044 A1 | 2/2016 |
| WO | 2014066349 A1 | 5/2014 |
| WO | 2017041306 A1 | 3/2017 |

* cited by examiner

EMBEDDED UNIVERSAL INTEGRATED CIRCUIT CARD PROFILE MANAGEMENT METHOD AND APPARATUS

CROSS-REFERENCE TO RELATED APPLICATIONS

This application is a U.S. National Stage of International Patent Application No. PCT/CN2017/094983 filed on 28 Jul. 2017, which claims priority to Chinese Patent Application No. 201710449255.X filed on Jun. 14, 2017. Both of the aforementioned applications are hereby incorporated by reference in their entireties.

TECHNICAL FIELD

This application relates to the field of communications technologies, and in particular, to an embedded universal integrated circuit card profile management method and apparatus.

BACKGROUND

In a mobile communications system, a smart card is usually used to store information such as user identity, a user authentication parameter and algorithm, a user phone book, SMS message data, and a customized parameter of an operator, so as to facilitate implementation of portability of user identity and data and differentiated customization between operators.

A universal integrated circuit card (Universal Integrated Circuit Card, UICC) is a removable smart card. A user only needs to remove the UICC card from one terminal and insert the UICC into another terminal, so as to conveniently transfer information stored in the UICC from one terminal to another terminal. The UICC may include one or more logical modules, such as a subscriber identity module (Subscriber Identity Module, SIM), a universal subscriber identity module (Universal Subscriber Identity Module, USIM), an IP multimedia services identity module (IP Multi Media Service Identity Module, ISIM for short), and other non-telecommunications application modules such as electronic signature authentication and a digital wallet. Different user terminals may select and use corresponding logical modules based on a type of a radio access network.

An embedded universal integrated circuit card (embedded Universal Integrated Circuit Card, eUICC), also referred to as an embedded SIM card (embedded SIM, eSIM), is a third-generation telecommunications smart card, and allows identity authentication applications of different operators to be dynamically loaded online. A driving force for developing the eUICC comes from a machine-to-machine (Machine to Machine, M2M) field. A large quantity of M2M devices make remote management device subscription become a more convenient solution. Currently, there is a trend indicating that the eUICC may also be used in a consumer field, so that a consumer user can dynamically change subscription, thereby greatly improving user experience.

However, when the operator changes a key negotiation algorithm of the eUICC, an operating system of the eUICC needs to be updated to replace the original key negotiation algorithm, and the operator triggers a user to update the operating system of the eUICC. After updating of the operating system of the eUICC is completed, an original profile is deleted, and an operator service cannot be used normally.

Because a hardware specification of the eUICC is limited by manufacturing costs and an application scenario, a memory is small, and a profile has been installed by the user and a corresponding configuration of the profile cannot be saved when the operating system of the eUICC is updated. After completing updating of the operating system, the operator service can be used only after the user re-downloads a profile, and then reconfigures the profile. A current subscription manager-data preparation (Subscription Manager-Data Preparation, SM-DP) server also does not store the profile configured before the operating system of the eUICC is updated, and the user cannot download, from the SM-DP, the profile configured before the operating system of the eUICC is updated. In a current standard, no mechanism can be used to restore the profile configured before the operating system of the eUICC is updated. Consequently, a process of configuring a new profile after the eUICC operating system is updated is relatively complex, thereby reducing intention of the user to update the operating system of the eUICC and user experience.

SUMMARY

Embodiments of the present invention provide an eUICC profile management method and apparatus, to resolve the foregoing problem in the prior art.

According to a first aspect, an embedded universal integrated circuit card eUICC profile management method is provided. The management method includes: when an operating system of the eUICC needs to be updated, setting, by a local profile assistant LPA, an operating system update flag, and obtaining metadata of a first profile, where the operating system update flag is used to identify that the eUICC is in an update status; obtaining, by the LPA, the metadata of the first profile; sending, by the LPA, a profile obtaining request to a profile server, where the profile obtaining request includes an eUICC identifier, a profile identifier, and the operating system update flag; receiving, by the LPA, the second profile sent by the profile server, and installing the second profile in the eUICC; configuring, by the LPA, metadata of the second profile based on the metadata of the first profile; and activating, by the LPA, the second profile based on the metadata of the second profile. The LPA sets the operating system update flag, and obtains and stores the metadata of the first profile, so that after completing upgrade of the operating system of the eUICC, a user can normally use an operator service without configuring a profile again, thereby simplifying a configuration process of the profile.

In an implementation of the first aspect, the obtaining, by the LPA metadata of a first profile further includes: obtaining, by the LPA, the eUICC identifier and a first profile identifier. Therefore, identity information of the eUICC and identity information of the first profile may be obtained.

In an implementation of the first aspect, before the receiving, by the LPA, the second profile, the method further includes: downloading, by the LPA, the operating system of the eUICC based on the eUICC identifier, the first profile identifier, and the operating system update flag. Therefore, it may be verified that a profile needs to be downloaded in the eUICC because of updating of the operating system.

In an implementation of the first aspect, before the LPA configures the metadata of the second profile based on the metadata of the first profile, the LPA receives the metadata of the second profile.

In an implementation of the first aspect, before the LPA receives the second profile, the LPA determines, based on the operating system update flag, that the second profile is a profile that needs to be downloaded in the eUICC.

In an implementation of the first aspect, the configuring, by the LPA, metadata of the second profile based on the metadata of the first profile includes: replacing, by the LPA, the metadata of the second profile with the metadata of the first profile. Therefore, the LPA may activate the second profile by using the metadata of the first profile, thereby restoring a profile configured before updating.

In an implementation of the first aspect, the configuring, by the LPA, metadata of the second profile based on the metadata of the first profile includes: when field content of the metadata of the first profile is different from field content of the metadata of the second profile, replacing, by the LPA, the field content of the second profile with the field content of the first profile. Therefore, the LPA can ensure consistency of corresponding fields of the metadata of the first profile and the metadata of the second profile, thereby restoring the profile configured before updating.

In an implementation of the first aspect, before the LPA downloads the second profile, the management method further includes: obtaining, by the LPA, an address of the profile server. Therefore, the LPA may obtain the address of the profile server that generates the second profile corresponding to the eUICC.

According to a second aspect, an embedded universal integrated circuit card eUICC profile management method is provided. The method includes: when an operating system of the eUICC needs to be updated, receiving, by a profile server, a profile obtaining request sent by a local profile assistant LPA, where the profile obtaining request includes an eUICC identifier, a profile identifier, and an operating system update flag, and the operating system update flag is used to identify that the eUICC is in an update status; generating, by the profile server, a second profile based on the profile obtaining request; and sending, by the profile server, the second profile to the LPA. The LPA sets the operating system update flag, and obtains and stores metadata of a first profile. The profile server determines, by using the operating system update flag, that a profile is generated, so that after completing upgrade of the operating system of the eUICC, a user can normally use an operator service without configuring a profile again, thereby simplifying a configuration process of the profile.

In an implementation of the second aspect, after the profile server generates the second profile based on the profile obtaining request, the profile server generates metadata of the second profile.

In an implementation of the second aspect, the sending, by the profile server, the second profile to the LPA includes: sending, by the profile server, the second profile and the metadata of the second profile to the LPA.

In an implementation of the second aspect, the generating, by the profile server, a second profile based on the profile obtaining request includes: determining, by the profile server based on the operating system update flag, whether the second profile needs to be generated; and when the second profile needs to be generated, generating, by the profile server, the second profile based on the profile obtaining request. Therefore, the profile server may determine that a profile needs to be generated in the eUICC because of updating of the operating system.

According to a third aspect, an embedded universal integrated circuit card eUICC profile management apparatus is provided. The management apparatus includes: a setting module, configured to: when an operating system of the eUICC needs to be updated, set an operating system update flag and obtain metadata of a first profile, where the operating system update flag is used to identify that the eUICC is in an update status; an obtaining module, configured to obtain the metadata of the first profile, where the metadata of the first profile is used to indicate status information of the first profile of the eUICC; a sending module, configured to send a profile obtaining request to a profile server, where the profile obtaining request includes an eUICC identifier, a profile identifier, and the operating system update flag; and a receiving module, configured to: receive the second profile sent by the profile server, and install the second profile in the eUICC. The setting module is further configured to: configure metadata of the second profile based on the metadata of the first profile; and activate the second profile based on the metadata of the second profile. The LPA sets the operating system update flag, and obtains and stores the metadata of the first profile, so that after completing upgrade of the operating system of the eUICC, a user can normally use an operator service without configuring a profile again, thereby simplifying a configuration process of the profile.

In an implementation of the third aspect, the obtaining module is further configured to obtain the eUICC identifier and a first profile identifier. Therefore, identity information of the eUICC and identity information of the first profile may be obtained.

In an implementation of the third aspect, the receiving module is further configured to download the operating system of the eUICC based on the eUICC identifier, the first profile identifier, and the operating system update flag. Therefore, it may be verified that a profile needs to be downloaded in the eUICC because of updating of the operating system.

In an implementation of the third aspect, the receiving module is further configured to receive the metadata of the second profile.

In an implementation of the third aspect, the management apparatus further includes a determining module, and the determining module is configured to determine, based on the operating system update flag, that the second profile is a profile that needs to be downloaded in the eUICC.

In an implementation of the third aspect, the setting module is configured to replace the metadata of the second profile with the metadata of the first profile. Therefore, the LPA may activate the second profile by using the metadata of the first profile, thereby restoring a profile configured before updating.

In an implementation of the third aspect, the setting module is configured to: when field content of the metadata of the first profile is different from field content of the metadata of the second profile, replace the field content of the second profile with the field content of the first profile. Therefore, the LPA can ensure consistency of corresponding fields of the metadata of the first profile and the metadata of the second profile, thereby restoring the profile configured before updating.

In an implementation of the third aspect, the obtaining module is further configured to obtain an address of the profile server. Therefore, the LPA may obtain the address of the profile server that generates the second profile corresponding to the eUICC.

According to a fourth aspect, an embedded universal integrated circuit card eUICC profile server is provided. The profile server includes: a receiving module, configured to: when an operating system of the eUICC needs to be updated, receive a profile obtaining request sent by a local profile assistant LPA, where the profile obtaining request includes an eUICC identifier, a profile identifier, and an operating system update flag, and the operating system update flag is used to identify that the eUICC is in an update status; a generation module, configured to generate a second profile based on the profile obtaining request; and a sending module, configured to send the second profile to the LPA. The LPA sets the operating system update flag, and obtains and stores metadata of a first profile. The profile server determines, by using the operating system update flag, that a profile is generated, so that after completing upgrade of the operating system of the eUICC, a user can normally use an operator service without configuring a profile again, thereby simplifying a configuration process of the profile.

In an implementation of the fourth aspect, the generation module is further configured to generate metadata of the second profile.

In an implementation of the fourth aspect, the sending module is further configured to send the second profile and the metadata of the second profile to the LPA.

In an implementation of the fourth aspect, the generation module is further configured to: determine, based on the operating system update flag, whether the second profile needs to be generated; and when the second profile needs to be generated, generate the second profile based on the profile obtaining request. Therefore, the profile server may determine that a profile needs to be generated in the eUICC because of updating of the operating system.

According to a fifth aspect, an embedded universal integrated circuit card eUICC profile management apparatus is provided. The management apparatus includes a processor, a memory, and a transceiver. The processor is configured to: when an operating system of the eUICC needs to be updated, set an operating system update flag and obtain metadata of a first profile, where the operating system update flag is used to identify that the eUICC is in an update status; and obtain the metadata of the first profile, where the metadata of the first profile is used to indicate status information of the first profile of the eUICC; the transceiver is configured to: send a profile obtaining request to a profile server, where the profile obtaining request includes an eUICC identifier, a profile identifier, and the operating system update flag; and receive the second profile sent by the profile server, and install the second profile in the eUICC; and the processor is further configured to: configure metadata of the second profile based on the metadata of the first profile; and activate the second profile based on the metadata of the second profile. The LPA sets the operating system update flag, and obtains and stores the metadata of the first profile, so that after completing upgrade of the operating system of the eUICC, a user can normally use an operator service without configuring a profile again, thereby simplifying a configuration process of the profile.

In an implementation of the fifth aspect, the processor is further configured to obtain the eUICC identifier and a first profile identifier. Therefore, identity information of the eUICC and identity information of the first profile may be obtained.

In an implementation of the fifth aspect, the transceiver is further configured to download the operating system of the eUICC based on the eUICC identifier, the first profile identifier, and the operating system update flag. Therefore, it may be verified that a profile needs to be downloaded in the eUICC because of updating of the operating system.

In an implementation of the fifth aspect, the transceiver is further configured to receive the metadata of the second profile.

In an implementation of the fifth aspect, the processor is further configured to determine, based on the operating system update flag, that the second profile is a profile that needs to be downloaded in the eUICC.

In an implementation of the fifth aspect, the processor is further configured to replace the metadata of the second profile with the metadata of the first profile. Therefore, the LPA may activate the second profile by using the metadata of the first profile, thereby restoring a profile configured before updating.

In an implementation of the fifth aspect, the processor is further configured to: when field content of the metadata of the first profile is different from field content of the metadata of the second profile, replace the field content of the second profile with the field content of the first profile. Therefore, the LPA can ensure consistency of corresponding fields of the metadata of the first profile and the metadata of the second profile, thereby restoring the profile configured before updating.

In an implementation of the fifth aspect, the processor is further configured to obtain an address of the profile server. Therefore, the LPA may obtain the address of the profile server that generates the second profile corresponding to the eUICC.

According to a sixth aspect, an embedded universal integrated circuit card eUICC profile server is provided. The profile server includes a processor, a memory, and a transceiver. The transceiver is configured to: when an operating system of the eUICC needs to be updated, receive a profile obtaining request sent by a local profile assistant LPA, where the profile obtaining request includes an eUICC identifier, a profile identifier, and an operating system update flag, and the operating system update flag is used to identify that the eUICC is in an update status; the processor is configured to generate a second profile based on the profile obtaining request; and the transceiver is further configured to send the second profile to the LPA. The LPA sets the operating system update flag, and obtains and stores metadata of a first profile. The profile server determines, by using the operating system update flag, that a profile is generated, so that after completing upgrade of the operating system of the eUICC, a user can normally use an operator service without configuring a profile again, thereby simplifying a configuration process of the profile.

In an implementation of the sixth aspect, the processor is further configured to generate metadata of the second profile.

In an implementation of the sixth aspect, the transceiver is further configured to send the second profile and the metadata of the second profile to the LPA.

In an implementation of the sixth aspect, the processor is further configured to: determine, based on the operating system update flag, whether the second profile needs to be generated; and when the second profile needs to be generated, generate the second profile based on the profile obtaining request. Therefore, the profile server may determine that a profile needs to be generated in the eUICC because of updating of the operating system.

According to a seventh aspect, a computer program product that includes an instruction is provided. When the instruction runs on a computer, the computer is enabled to perform the method according to the first aspect or the second aspect.

According to an eighth aspect, a computer readable storage medium is provided. The computer readable storage medium stores a computer program. When the computer program is executed by a processor, the method according to the first aspect or the second aspect is implemented.

According to the eUICC profile management method and apparatus provided in the embodiments of the present invention, when the operating system of the eUICC needs to be updated, the LPA sets the operating system update flag, and obtains and stores the metadata of the first profile. The profile server generates the second profile based on the operating system update flag, generates the metadata of the second profile. The LPA configures the metadata of the second profile based on the metadata of the first profile, and activates the second profile based on the configured metadata of the second profile, so that after completing upgrade of the operating system of the eUICC, a user can normally use an operator service without configuring a profile again, thereby simplifying a configuration process of the profile, and improving intention of the user to update the operating system of the eUICC and user experience.

DESCRIPTION OF EMBODIMENTS

The following describes the embodiments of the present invention with reference to the accompanying drawings in the embodiments of the present invention.

Figure 1:
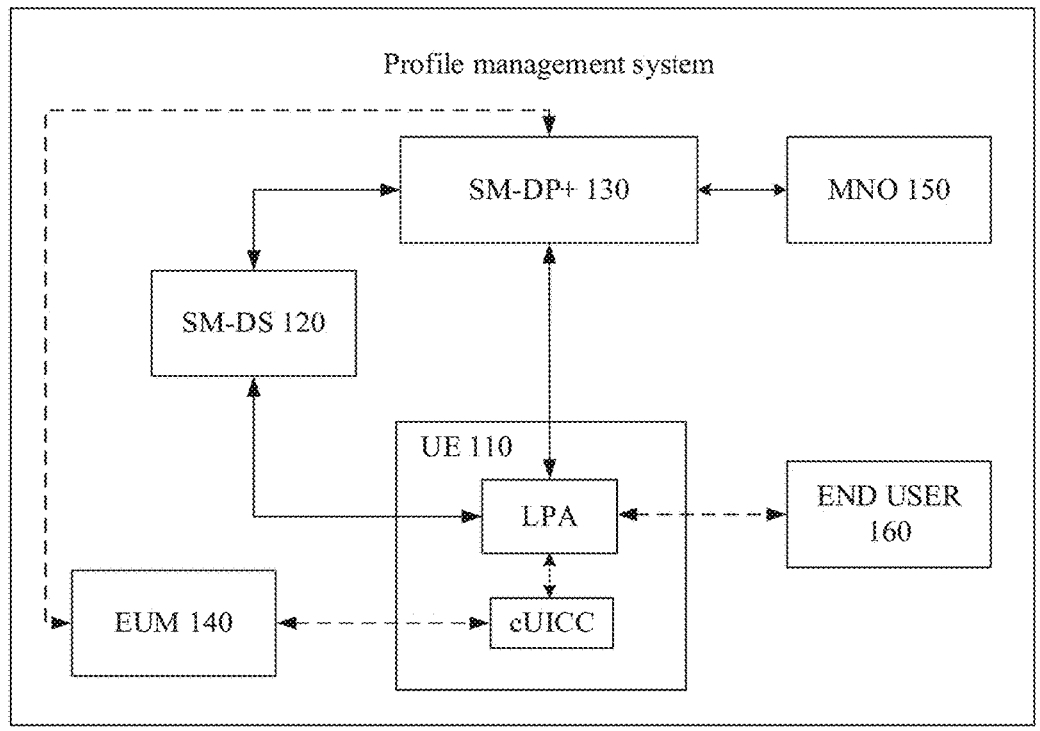
FIG. 1 is a schematic structural diagram of an eUICC profile management system according to an embodiment of the present invention.

FIG. 1 is a schematic diagram of a network architecture of an eUICC profile management system according to an embodiment of the present invention.

As shown in FIG. 1, the network architecture of the eUICC profile management system may include user equipment (User Equipment. UE) 110, a subscription manager-discovery server (Subscription manager-Discovery Service, SM-DS) 120, a subscription manager-data preparation (Subscription Manager-Data Preparation+. SM-DP+) server 130, an eUICC manufacturer (eUICC Manufacture, EUM) master server 140, a mobile network operator (Mobile Network Operator, MNO) server 150, and an end user (end user) 160.

In this embodiment of the present invention, the UE 110 may include an LPA, an eUICC, and a modem (not shown in the figure). The LPA may be configured to: obtain a to-be-processed event record from the SM-DS 120, download and manage a profile profile, and provide a user interface (user interface, UI) (for example, an eUICC management interface) for a user, so that the user manages a profile on the eUICC (for example, activating, disabling, and deleting of the profile). The eUICC may be welded to the UE when the UE is delivered at a factory, or may be installed on the UE in a pluggable manner. The modem may be configured to enable the eUICC to register on a mobile network.

The UE 110 may also be referred to as a system, a terminal, a subscriber unit, a subscriber station, a mobile station, a mobile console, a remote station, a remote terminal, a mobile device, a user terminal, a mobile terminal, a wireless communications device, a user agent, or a user apparatus. For example, the UE 110 may be a cellular phone, a cordless phone, a session initiation protocol (Session Initiation Protocol, SIP) phone, a wireless local loop (Wireless Local Loop, WLL) station, a tablet computer, a personal digital assistant (Personal Digital Assistant, PDA), a handheld device that has a wireless communications function, a computing device, an in-vehicle communications module, an M2M device, a smart meter, a smart home device, another processing device that is connected to a wireless modem, or the like.

The SM-DS 120 may be configured to register and store a to-be-processed event of the eUICC, such as an eUICC operating system update event, based on an event identifier (Event Identification, EventID). The SM-DS 120 may be further configured to store an address of the SM-DP+ 130, and send the address of the SM-DP+ 130 to the LPA on the UE 110.

The SM-DP+ 130 may be configured to create, generate, manage, and protect a profile generated by the SM-DP+ 130. The SM-DP+ 130 may be further configured to provide: a profile in a bound profile package (bound profile package), and enable the bound profile package to be securely transmitted. The SM-DP+ 130 may be configured to create an issuer security domain profile (Issuer Security Domain Profile, ISD-P) in the eUICC. The SM-DP+ 130 generates a profile, which may be immediately generating the profile when a request of the MNO is received, or may be reading a profile pre-stored in the SM-DP+. The SM-DP+ 130 may be used as an operating system delivery system (OS Delivery System, ODS), so that the SM-DP+ 130 is used to generate the eUICC operating system update event, store an operating system of the eUICC, and transfer the operating system of the eUICC. The SM-DP+ 130 may further be used as a subscription manager-secure routing (Subscription manager-Security Route, SM-SR) server.

It may be understood that in addition to the SM-DP+ 130, a profile server may further include at least one of the SM-DS 120, the SM-DP+ 130, and the MNO 150. The profile server may generate a profile profile required for accessing a corresponding operator network server by the eUICC, and send the profile to the eUICC, to prompt the eUICC to install the profile. The profile of the eUICC may be generated immediately when the profile is requested, or may be pre-stored. When a new profile is requested, the profile server may allocate the pre-stored profile to the eUICC that makes a request.

The EUM 140 may be configured to: manufacture and prepare the eUICC and the operating system of the eUICC, and provide an updated image file of the operating system of the eUICC.

The MNO 150 may provide access and communications network services for the user by using the mobile network.

Figure 2:
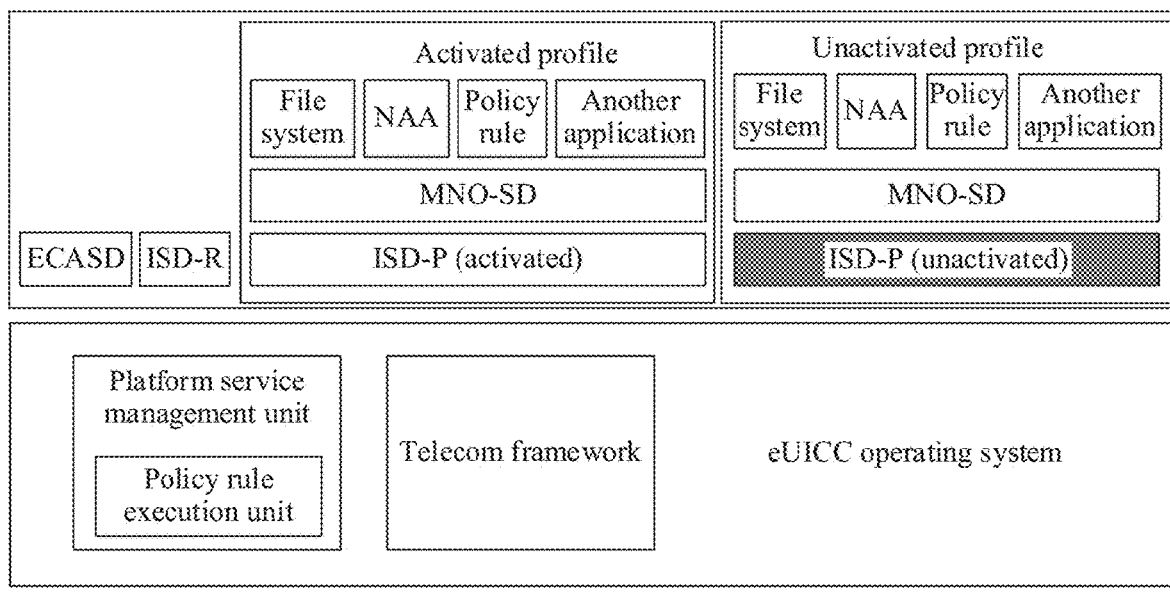
FIG. 2 is a diagram of an internal logical structure of an eUICC according to an embodiment of the present invention.

FIG. 2 is a diagram of an internal logical structure of an eUICC according to an embodiment of the present invention. As shown in FIG. 2, the internal logical structure of the eUICC includes:

an eUICC controlling authority security domain (eUICC Controlling Authority Security Domain, ECASD), used to store an eUICC key and an eUICC certificate;

an issuer security domain root (Issuer Security Domain Root, ISD-R), associated with a subscription manager-secure routing (not shown in the figure) outside the eUICC, and configured to establish a secure communication channel between the eUICC and an SM-DP+, and create a new issuer security domain profile;

an issuer security domain profile (Issuer Security Domain Profile, ISD-P), also referred to as a profile domain, used to store a profile, store a key for secure communication between the eUICC and the SM-DP+, and decrypt and install a profile credential; and profiles: FIG. 2 shows two profiles, one is an activated profile, and the other is an unactivated profile. Each profile further includes a file system, a network access application (Network Access Application, NAA), a policy rule, another application, and a mobile network operator security domain (Mobile Network Operator Security Domain. MNO-SD).

The activated profile is stored in an activated profile area, and the unactivated profile is stored in an unactivated profile area. Only the activated profile can enable the eUICC to normally use a network service provided by an MNO 150.

The internal logical structure of the eUICC further includes an operating system of the eUICC, and the operating system of the eUICC includes a platform service management unit (Platform Service Manager) and a telecom framework (Telecom Framework). The platform service management unit is configured to provide a platform management function and a policy rule execution mechanism. The telecom framework is configured to provide a standard network authorization algorithm for the NAA, and can further use a requirement parameter configuration algorithm.

Figure 3A:
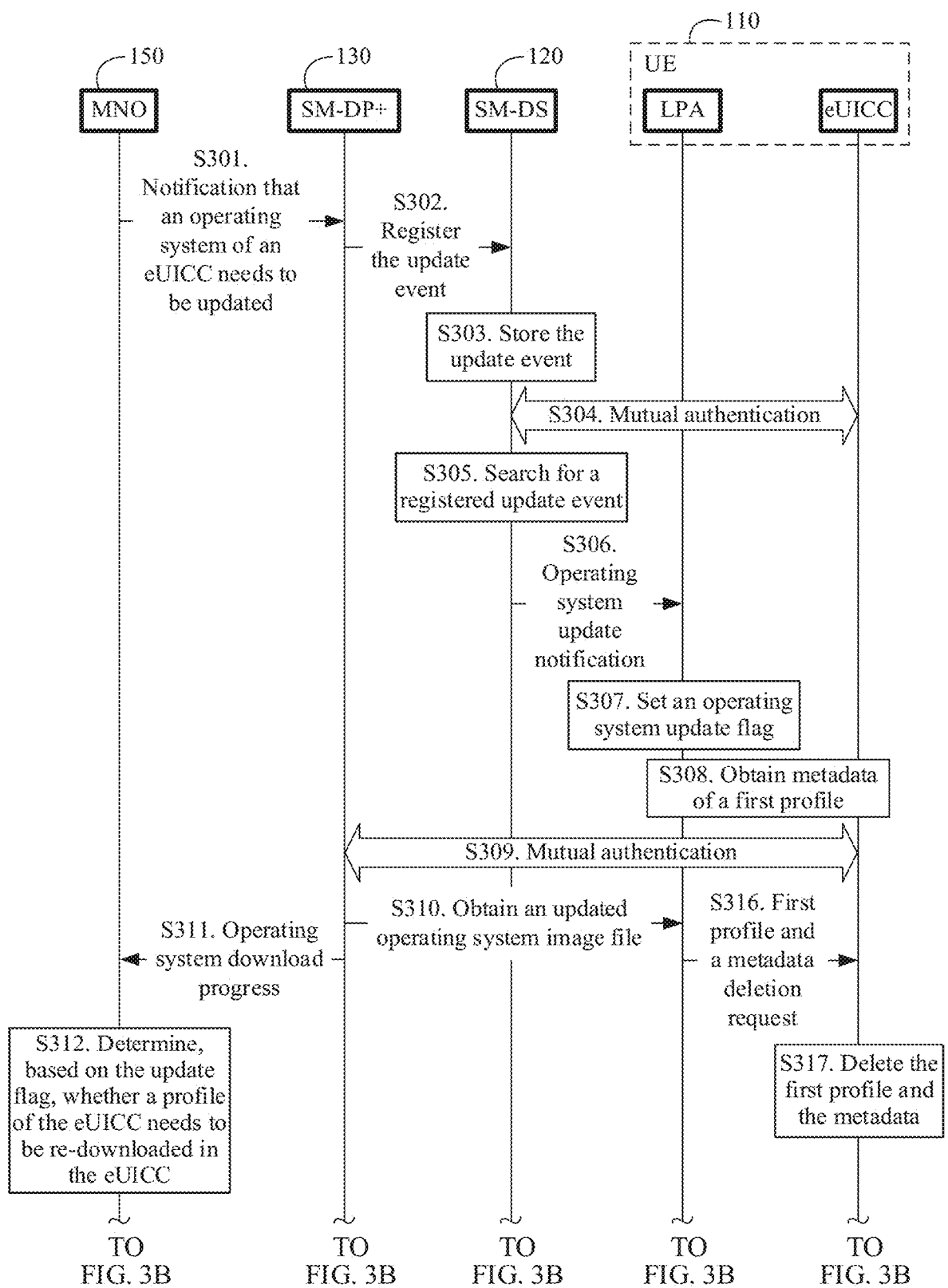
FIG. 3A and FIG. 3B are a schematic flowchart of a first eUICC profile management method according to an embodiment of the present invention.
Figure 3B:
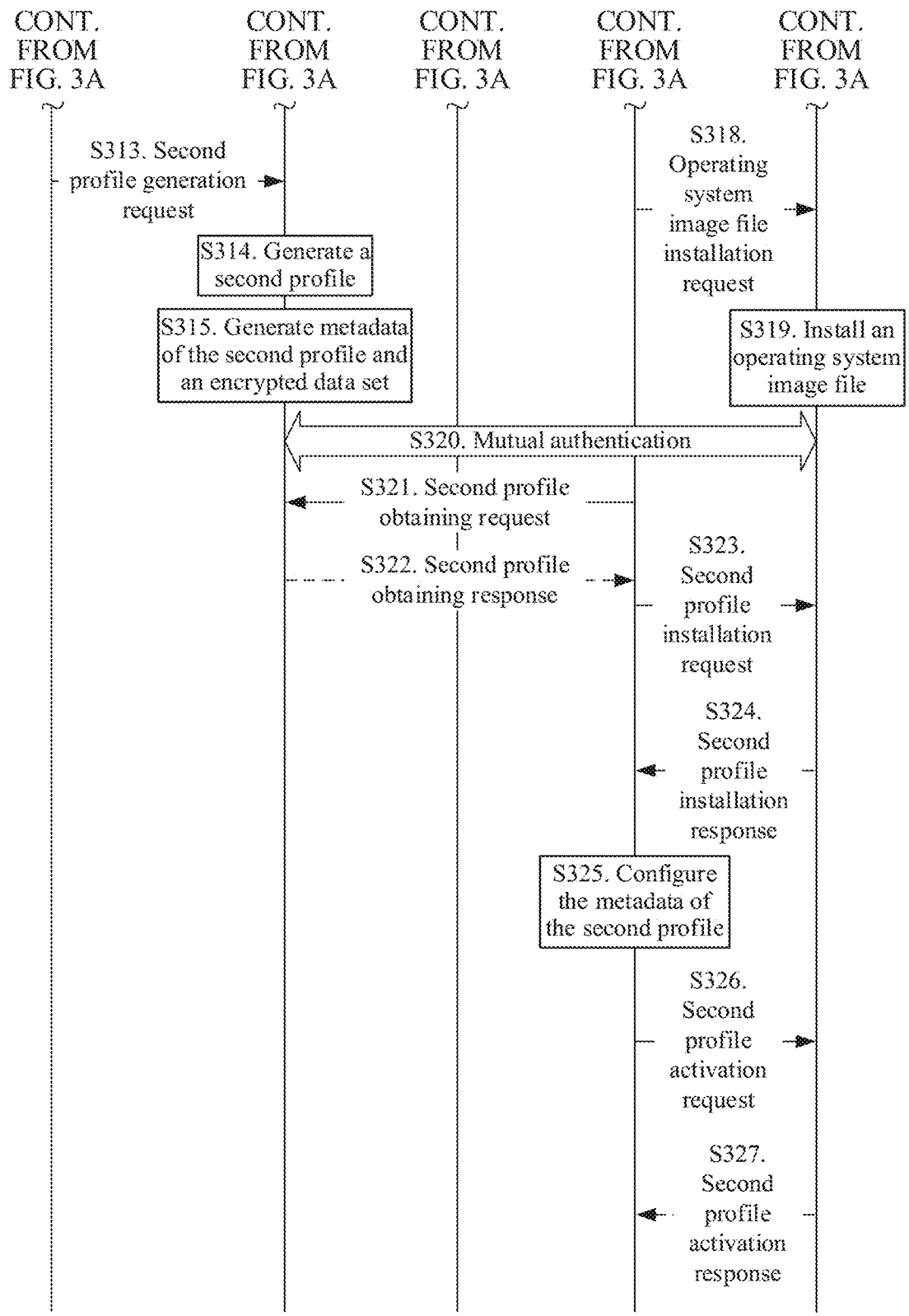

FIG. 3A and FIG. 3B are a schematic flowchart of a first eUICC profile management method according to an embodiment of the present invention. UE 110, an SM-DS 120, an SM-DP+ 130, and an MNO 150 are included in FIG. 3A and FIG. 3B. As shown in FIG. 3A and FIG. 3B, the profile management method may include the following steps.

S301. The MNO 150 notifies the SM-DP+ 130 that an operating system of an eUICC needs to be updated.

Specifically, when the MNO 150 determines that the operating system of the eUICC needs to be updated, the MNO 150 notifies the SM-DP+ 130 that the operating system of the eUICC needs to be updated. The MNO 150 may determine, in following manners, that the operating system of the eUICC needs to be updated.

Manner 1: An eUICC manufacturer master server EUM 140 generates, based on a hardware version and a firmware version of the eUICC, operating system update files required by eUICCs with different hardware versions and firmware versions, and notifies the MNO 150 that an operating system of an eUICC needs to be updated currently. When sending an eUICC operating system update notification to the MNO 150, the EUM 140 may send, to the MNO 150, eUICC identifiers (eUICC Identification, EID) corresponding to the eUICCs with different hardware versions and firmware versions.

Manner 2: The MNO 150 actively initiates updating of the operating system of the eUICC. The MNO 150 may determine, based on stored eUICC information, the eUICC whose operating system needs to be updated.

The MNO 150 notifies the SM-DP+ 130 that the operating system of the eUICC needs to be updated, and may send the notification by invoking a function ConfirmOrder. After receiving the notification that is sent by the MNO 150 and that indicates that the operating system of the eUICC needs to be updated, the SM-DP+ 130 generates both an update event and an update event identifier (event identification, EventID) corresponding to the update event.

S302. The SM-DP+ 130 registers the operating system update event with the SM-DS 120.

Specifically, the SM-DP+ 130 may register the EventID of the update event with the SM-DS 120 by invoking a function RegisterEvent. The function carries a parameter EID, an address of the SM-DP+ 130, and the EventID. The address of the SM-DP+ 130 may be an address of a default SM-DP+ for updating the operating system of the eUICC or may be an address of an SM-DP+ corresponding to the current operating system update event. This is not limited in this application.

S303. The SM-DS 120 stores the operating system update event.

After receiving a registration update event request sent by the SM-DP+ 130, the SM-DS 120 stores the EID, the address of the SM-DP+ 130, and the EventID in the update event request, establishes a correspondence between the EventID and each of the EID and the SM-DP+, and completes registration of the operating system update event.

S304. The eUICC performs mutual authentication with the SM-DS 120.

The mutual authentication between the eUICC and the SM-DS 120 may be performed by using a symmetric key authentication method, or may be performed by using a public key infrastructure (public key infrastructure. PKI)-authentication method, or may be performed by using another authentication method. This is not limited in this application.

S305. The SM-DS 120 searches for a registered operating system update event.

After the mutual authentication between the eUICC and the SM-DS 120 is completed, the SM-DS 120 may obtain information about the eUICC, for example, the EID, and query, based on the EID, whether an EventID of a to-be-processed event is registered, for example, the EventID of the operating system update event of the eUICC. After finding a stored to-be-processed event, the SM-DS 120 sends the EventID to an LPA on the UE 110.

The LPA sends a to-be-processed event query request to the SM-DS 120. The to-be-processed event query request includes the EventID. Specifically, the LPA invokes a function RegisterRetrieval, and the function carries the EventID.

The LPA may send the to-be-processed event query request based on a preset condition. For example, when the eUICC is started, the LPA sends the to-be-processed event query request to the SM-DS 120, so as to determine whether the SM-DS 120 stores a to-be-processed event related to the eUICC, for example, the operating system update event. The eUICC may alternatively send the to-be-processed event query request based on a preset time interval. For example, the eUICC sends the query request to the SM-DS 120 at a specific time in each week or month. The eUICC may alternatively send the to-be-processed event query request based on a user request. For example, a user chooses to update the operating system of the eUICC by using an eUICC management application interface on the UE 110, so as to trigger the eUICC to send the to-be-processed event query request to the SM-DS 120. It may be understood that the preset time interval or a predetermined time may be determined based on an actual requirement. This is not limited in this application.

S306. The SM-DS 120 sends an operating system update notification to an LPA.

When the SM-DS 120 finds the operating system update event corresponding to the eUICC, the SM-DS 120 sends a to-be-processed event query response to the LPA, and the to-be-processed event may be, for example, the operating system update event of the eUICC. The to-be-processed event query response notifies the LPA that the operating system of the eUICC needs to be updated. The to-be-processed event query response includes the address of the SM-DP+ 130 and the EventID of the operating system update event.

S307. The LPA sets an operating system update flag.

After receiving the eUICC operating system update notification sent by the SM-DS 120, the LPA determines that the operating system of the eUICC needs to be updated, and the LPA may set the operating system update flag (OSupdateflag). The operating system update flag may be used to identify a corresponding operating system update event of the eUICC. The operating system update flag may be represented in different forms, for example, represented by a number or a text.

In an example, the update flag may be represented by a number. If the LPA determines to update the operating system of the eUICC, the LPA may set a value of the OSupdateflag to 1, and it indicates that the eUICC is currently in an updatable state of the operating system of the eUICC. Otherwise, the LPA may set a value of the OSupdateflag to 0, and it indicates that the eUICC is currently in a non-updatable state of the operating system.

In another example, the update flag may be represented by using a text. If the LPA determines to update the operating system of the eUICC, the LPA may write, in the OSupdateflag, text information that the operating system of the eUICC needs to be updated, so as to indicate that the eUICC is currently in an updatable state of the operating system. Otherwise, the LPA may write, in the OSupdateflag, information that the operating system of the eUICC does not need to be updated, so as to indicate that the eUICC is currently in a non-updatable state of the operating system. It may be understood that the LPA may alternatively leave a blank in the OSupdateflag, so as to indicate that the eUICC is currently in the non-updatable state of the operating system. A profile server, such as the SM-DS 120, the SM-DP+ 130, or the MNO 150, may parse the text information written in the OSupdateflag, so as to obtain a current status of the eUICC.

In some other examples, the update flag may alternatively be represented in an existing form, provided that the update flag can indicate a current status of the eUICC. This is not limited in this application.

It should be noted that before determining to update the operating system of the eUICC, the LPA may send prompt information to the user, for example, send the prompt information by using a user interface, to request the user to determine whether to update the operating system of the eUICC. When the user determines to update the operating system of the eUICC, the LPA determines to update the operating system of the eUICC.

S308. The LPA obtains metadata of a first profile of the eUICC.

The LPA may send a profile metadata obtaining request to the eUICC, so as to obtain information about the first profile of the eUICC and the metadata of the first profile. The information about the first profile may include an activation state of the first profile and a first profile identifier (Integrated Circuit Card Identification, ICCID). The metadata of the first profile may be used to indicate status information of the first profile of the eUICC. The LPA may send the profile metadata obtaining request by invoking a function GetProfilesInfo. After receiving the profile metadata obtaining request sent by the LPA, the eUICC sends a profile metadata obtaining response to the LPA. The profile metadata obtaining response includes the metadata of the first profile, namely, metadata of a current profile in the eUICC. It may be understood that, in a process of using the eUICC, the LPA may obtain the metadata of the first profile of the eUICC for a plurality of times, and store the metadata in the LPA.

Optionally, the LPA may further send an eUICC information obtaining request to the eUICC, so as to obtain information about the eUICC. The information about the eUICC may include information such as the EID and an eUICC information set (eUICC Information Set, EIS). The LPA may send the eUICC information obtaining request by invoking a function GeteUICCInfo. After receiving the eUICC information obtaining request sent by the LPA, the eUICC sends an eUICC information obtaining response to the LPA. The eUICC information obtaining response includes the information about the eUICC such as the EID and the ICCID. It may be understood that the LPA may send the eUICC information obtaining request to the eUICC at any time. For example, the LPA may send the eUICC information obtaining request before sending the profile metadata obtaining request, may send the eUICC information obtaining request after sending the profile metadata obtaining request, or may simultaneously send the eUICC information obtaining request and the profile metadata obtaining request. The eUICC information obtaining response and the profile metadata obtaining response may be separately sent by the eUICC to the LPA, or may be sent together.

Optionally, the LPA may further obtain the information about the eUICC by using a short-distance communication technology, such as a radio frequency identification technology, a near-field communication technology, and a quick response code scanning manner. Details are not described herein again in this application.

After obtaining the metadata of the first profile, the LPA may store the metadata of the first profile, for example, store the metadata of the first profile in a memory.

It should be noted that step S308 may alternatively be performed before S307, or may be performed simultaneously with S307. This is not limited in this application.

S309. The eUICC performs mutual authentication with the SM-DP+ 130.

For the mutual authentication between the eUICC and the SM-DP+ 130, refer to step 304. Details are not described herein again.

S310. The LPA obtains an updated operating system image file.

After the eUICC and the SM-DP+ 130 complete the mutual authentication, or when the LPA determines that a secure channel established between the eUICC and the SM-DP+ 130 through mutual authentication is not closed, the LPA sends an operating system image file obtaining request to the SM-DP+ 130. The operating system image file obtaining request may include the EID, the ICCID, a profile type (profile type), and the operating system update flag.

After receiving the operating system image file obtaining request sent by the LPA, the SM-DP+ 130 may determine, based on the EID and the ICCID, an operating system image file required by the eUICC, and send an operating system image file response to the LPA. The operating system image file response may include the updated operating system image file. Alternatively, the operating system image file response may include an indication message, and the indication message instructs the LPA to download the operating system image file from the SM-DP+ 130. Optionally, the SM-DP+ 130 may determine, based on the operating system update flag, that the operating system of the eUICC needs to be updated.

Optionally, the LPA may alternatively send the operating system image file obtaining request to the MNO 150. After receiving the operating system image file obtaining request, the MNO 150 instructs the SM-DP+ 130 to send the operating system image file to the LPA.

S311. The SM-DP+ 130 sends an operating system download progress notification to the MNO 150.

The operating system download progress notification sent by the SM-DP+ 130 to the MNO 150 may include the EID, the ICCID, the profile type, and the operating system update flag, so as to feed back a download progress of the operating system image file to the MNO 150. For example, the SM-DP+ 130 may feed back a message that the operating system image file is to be downloaded or is downloaded to the MNO 150. The SM-DP+ 130 may send the operating system download progress notification by invoking a function HandleOSDownloadProgressInfo.

S312. The MNO 150 determines, based on the operating system update flag, whether a profile needs to be re-downloaded in the eUICC.

After receiving the operating system download progress notification sent by the SM-DP+ 130, the MNO 150 determines, based on the operating system update flag in the operating system download progress notification, whether the profile needs to be re-downloaded in the eUICC.

In an example, when the value of the operating system update flag is 1, the MNO 150 determines that a second profile needs to be re-downloaded in the eUICC because of updating of the operating system. When the value of the operating system update flag is 0, the MNO 150 determines that the second profile does not need to be re-downloaded because the operating system of the eUICC is not updated.

In another example, when the operating system update flag includes operating system update text information, the MNO 150 parses the text information in the operating system update flag, so as to determine whether the profile needs to be re-downloaded in the eUICC. When the text information includes information that the operating system of the eUICC is updated, the MNO 150 determines that the profile needs to be re-downloaded in the eUICC.

S313. The MNO 150 sends a second profile generation request to the SM-DP+ 130.

The second profile generation request may carry parameters such as the EID, the ICCID, the profile type, and the operating system update flag, so as to instruct the SM-DP+ 130 to generate the second profile. The MNO 150 may send the second profile generation request to the SM-DP+ 130 by invoking a function DownloadOrder.

S314. The SM-DP+ 130 generates a second profile.

After receiving the second profile generation request sent by the MNO 150, the SM-DP+ 130 may generate the second profile based on the parameter carried in the second profile generation request. For example, the SM-DP+ 130 generates, based on the EID and the profile type, a second profile corresponding to the eUICC. Alternatively, the SM-DP+ 130 generates, based on the ICCID and the profile type, a second profile corresponding to the eUICC.

S315. The SM-DP+ 130 generates metadata of the second profile and an encrypted data set.

After generating the second profile, the SM-DP+ 130 may generate the metadata of the second profile, and generate the encrypted data set (smdpsigned2). The encrypted data set may include a transaction identifier (Transaction Identification, Transaction ID) and a matching identifier (Matching Identification, Matching ID). The metadata of the second profile may be metadata automatically generated by the SM-DP+ 130 based on a pre-stored template.

S316. The LPA sends the first profile and a metadata deletion request to the eUICC.

After completing downloading of the operating system image file, the LPA sends the first profile and the metadata deletion request to the eUICC, so as to request the eUICC to delete the operational (operational) first profile and the metadata of the first profile. The LPA may send the first profile and the metadata deletion request by invoking a function eUICCMemoryReset.

S317. The eUICC deletes the first profile and the metadata.

After receiving the first profile and the metadata deletion request that are sent by the LPA, the eUICC deletes the operational first profile and the metadata of the first profile. The eUICC may invoke a function Refresh to refresh a modem, so that the eUICC re-registers with a network.

S318. The LPA sends an operating system image file installation request to the eUICC.

After deleting the operational first profile and the metadata of the first profile, the eUICC may notify the LPA that deletion is completed. After receiving the notification, the LPA sends the operating system image file installation request to the eUICC. The operating system image file installation request includes an updated operating system update file. The LPA may send the operating system image file installation request by invoking a function Install new OS image.

S319. The eUICC installs an operating system image file.

After receiving the operating system image file installation request sent by the LPA, the eUICC installs the updated operating system image file in the eUICC. After completing installation of the operating system image file, the eUICC may generate the address of the default SM-DP+. The address of the default SM-DP+ may be the same as the address of the SM-DP+ 130 that delivers the operating system image file, or may be an address of another SM-DP+. The eUICC may send the address of the default SM-DP+ to the LPA, so that the LPA can download a profile from an SM-DP+ corresponding to the address of the default SM-DP+. For ease of description, descriptions are provided in this application based on a case in which the address of the default SM-DP+ is the same as the address of the SM-DP+ 130 that delivers the operating system image file, in other words, the default SM-DP+ is the SM-DP+ 130.

It should be noted that steps S316 to S319 may be performed simultaneously with steps S311 to S315, or may be performed successively. For example, after steps S311 to S315 are completed, steps S316 to S319 are performed. Alternatively, after steps S316 to S319 are completed, steps S311 to S315 are performed.

S320. The eUICC performs mutual authentication with a corresponding SM-DP+ based on an address of a default SM-DP+.

As described above, the corresponding SM-DP+ may be the SM-DP+ 130. For the mutual authentication between the eUICC and the SM-DP+ 130, refer to step 304. Details are not described herein again. After the mutual authentication is completed, or when the SM-DP+ 130 determines that the secure channel established between the eUICC and the SM-DP+ 130 through mutual authentication is not closed, the SM-DP+ 130 sends the encrypted data set (smdpsigned2) to the LPA.

After receiving the encrypted data set (smdpsigned2), the LPA instructs, by invoking a function PrepareDownload, to prepare to download the second profile in the eUICC. Specifically, the function carries the smdpsigned2. The eUICC generates a temporary session key pair, decrypts the smdpsigned2 by using the session key pair, generates another encrypted data set (eUICCsigned2), and then generates an eUICC signature based on the eUICCsigned2. The eUICC signature is used to verify correctness of eUICCsigned2 content. If it is learned, through a check by using the eUICC signature, that the eUICCsigned2 content is correct, it indicates that verification succeeds.

S321. The LPA sends a second profile obtaining request to the SM-DP+ 130.

The second profile obtaining request may carry parameters such as the metadata of the first profile, the operating system update flag, and the eUICCsigned2. The SM-DP+ 160 decrypts the received eUICCsigned2, and verifies the decrypted eUICCsigned2. If it is found that the content of the decrypted eUICCsigned2 is correct, verification of the eUICCsigned2 succeeds. The SM-DP+ 130 checks the ICCID of the second profile. Because the ICCID is an identity of the second profile, the SM-DP+ 130 can verify, by checking whether the ICCID matches the second profile, whether the second profile is the profile that needs to be downloaded in the eUICC. The SM-DP+ 130 checks content of the operating system update flag, to determine that the profile needs to be re-downloaded in the eUICC because of updating of the operating system. The LPA may send the second profile obtaining request by invoking a function Get Bound Profile Package.

The second profile obtaining request may include a metadata obtaining request of the second profile, so that the LPA can configure the metadata of the second profile based on profile status information indicated by the stored metadata of the first profile. Optionally, the SM-DP+ 130 may send the metadata of the second profile and the encrypted data set (smdpsigned2) together to the LPA in step S321.

S322. The SM-DP+ 130 sends a second profile obtaining response to the LPA.

After the SM-DP+ 130 receives the second profile obtaining request sent by the LPA, the SM-DP+ 130 verifies the eUICCsigned2, the ICCID of the second profile, and the operating system update flag. After the eUICCsigned2, the ICCID of the second profile, and the operating system update flag are verified, the SM-DP+ 130 encrypts and packages the second profile and the metadata of the second profile, to generate an encryption profile package (bound profile package). The second profile obtaining response includes the encryption profile package.

It should be noted that, in steps S319 to S322, in addition to the SM-DP+ 130, the profile server may further include at least one of the SM-DS 120, the SM-DP+ 130, and the MNO 150. The profile server may generate a profile profile required for accessing a corresponding operator network server by the eUICC, and send the profile to the eUICC.

S323. The LPA sends a second profile installation request to the eUICC.

The LPA verifies whether the metadata of the second profile sent by the SM-DP+ 130 is tampered with, to determine validity of the metadata of the second profile. The LPA checks the ICCID of the second profile sent by the SM-DP+ 130, verifies whether the ICCID matches the second profile, and redetermines that the second profile is the profile needs to be downloaded in the eUICC. By verifying the operating system update flag sent by the SM-DP+ 130, the LPA redetermines that the profile needs to be re-downloaded in the eUICC because of updating of the operating system.

After the verification is completed, the LPA sends a second profile installation request to the eUICC. The LPA may decrypt the encryption profile package by invoking a function Install new profile, and install the second profile in the eUICC.

S324. The eUICC sends a second profile installation response to the LPA.

After completing installation of the second profile, the eUICC may send the second profile installation response to the LPA.

S325. The LPA configures the metadata of the second profile.

Because the LPA stores the metadata of the first profile, the LPA may configure the metadata of the second profile based on the metadata of the first profile, so as to restore the status information of the first profile.

In an example, the LPA may replace the metadata of the second profile with the metadata of the first profile. For example, when a field of the first profile is in a one-to-one correspondence with a field of the second profile, the LPA may replace the metadata of the second profile with the metadata of the first profile. It may be understood that when content of the metadata of the first profile is the same as content of the metadata of the second profile, the metadata of the second profile may be kept unchanged.

In another example, the LPA may compare the metadata of the first profile with the metadata of the second profile. For some different content between the metadata of the first profile and the metadata of the second profile, some content of the metadata of the first profile is used to replace some corresponding content of the metadata of the second profile. For example, when the field of the metadata of the first profile cannot be in a one-to-one correspondence with the field of the metadata of the second profile, the LPA compares corresponding fields of the metadata of the first profile and the metadata of the second profile. When content of the corresponding fields of the metadata of the first profile and the metadata of the second profile is different, the LPA replaces field content of the metadata of the second profile with field content of the metadata of the first profile.

Optionally, when the LPA stores metadata of a plurality of first profiles, the LPA may configure the metadata of the second profile based on metadata of the first profile that is stored most recently before the operating system image file of the eUICC is installed.

S326. The LPA sends a second profile activation request to the eUICC.

The second profile activation request may include metadata of the second profile that is configured, so as to activate, based on the metadata of the second profile, the second profile that has been installed in the eUICC. After completing activation of the second profile, the LPA may send the second profile activation request by invoking a function EnableProfile. The eUICC may invoke the function Refresh to refresh the modem, so that the eUICC re-registers with the network.

S327. The eUICC sends a second profile activation response to the LPA.

After completing activation of the second profile, the eUICC sends the second profile activation response to the LPA, so as to notify that the second profile of the eUICC is activated successfully.

According to the eUICC profile management method provided in this embodiment of the present invention, when the operating system of the eUICC needs to be updated, the LPA sets the operating system update flag, and obtains and stores the metadata of the first profile. The profile server generates the second profile based on the operating system update flag, and generates the metadata of the second profile. The LPA configures the metadata of the second profile based on the metadata of the first profile, and activates the second profile based on the configured metadata of the second profile, so that after completing upgrade of the operating system of the eUICC, the user can normally use an operator service without configuring a profile again, thereby simplifying a configuration process of the profile, and improving intention of the user to update the operating system of the eUICC and user experience.

Figure 4A:
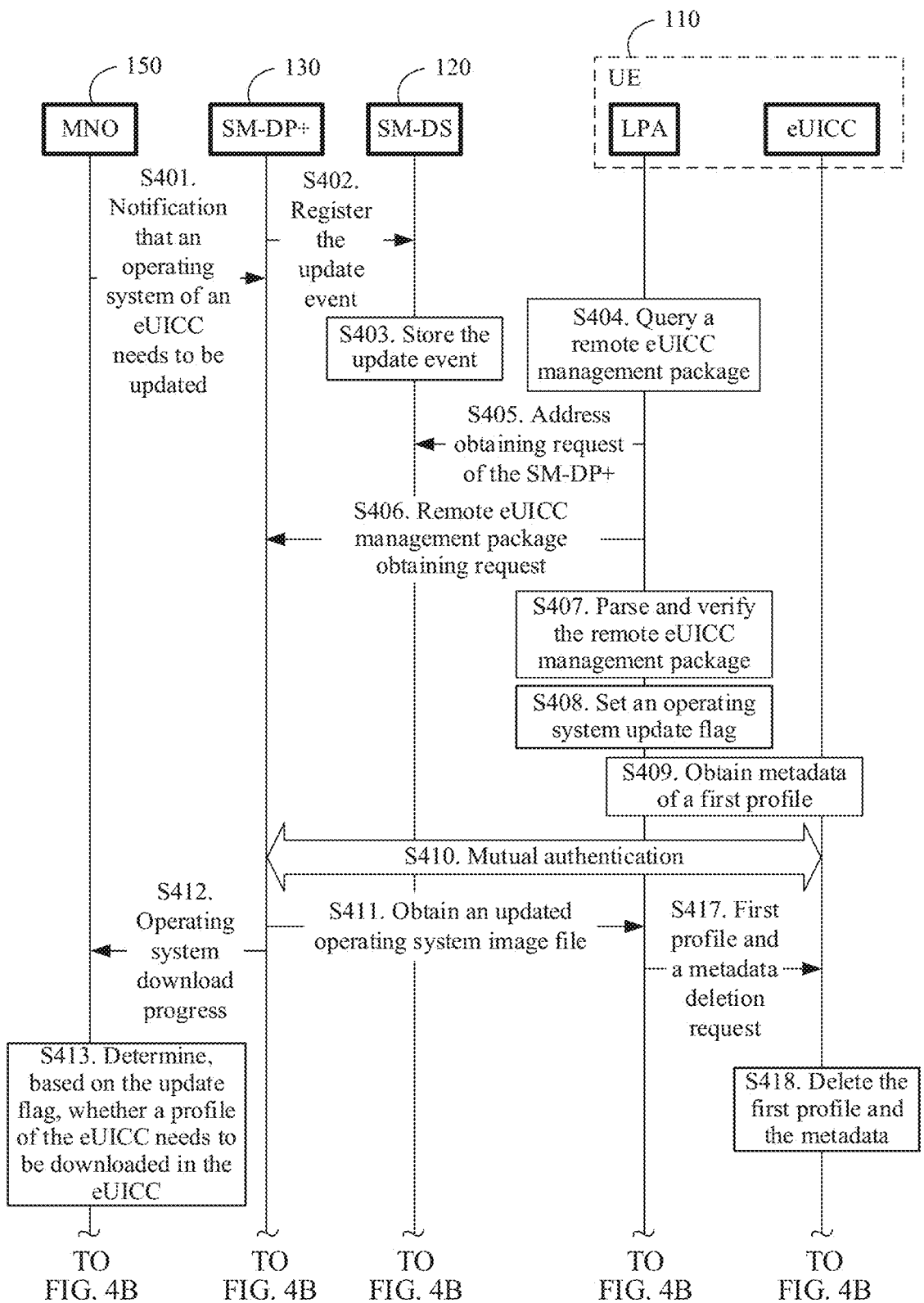
FIG. 4A and FIG. 4B are a schematic flowchart of a second eUICC profile management method according to an embodiment of the present invention.
Figure 4B:
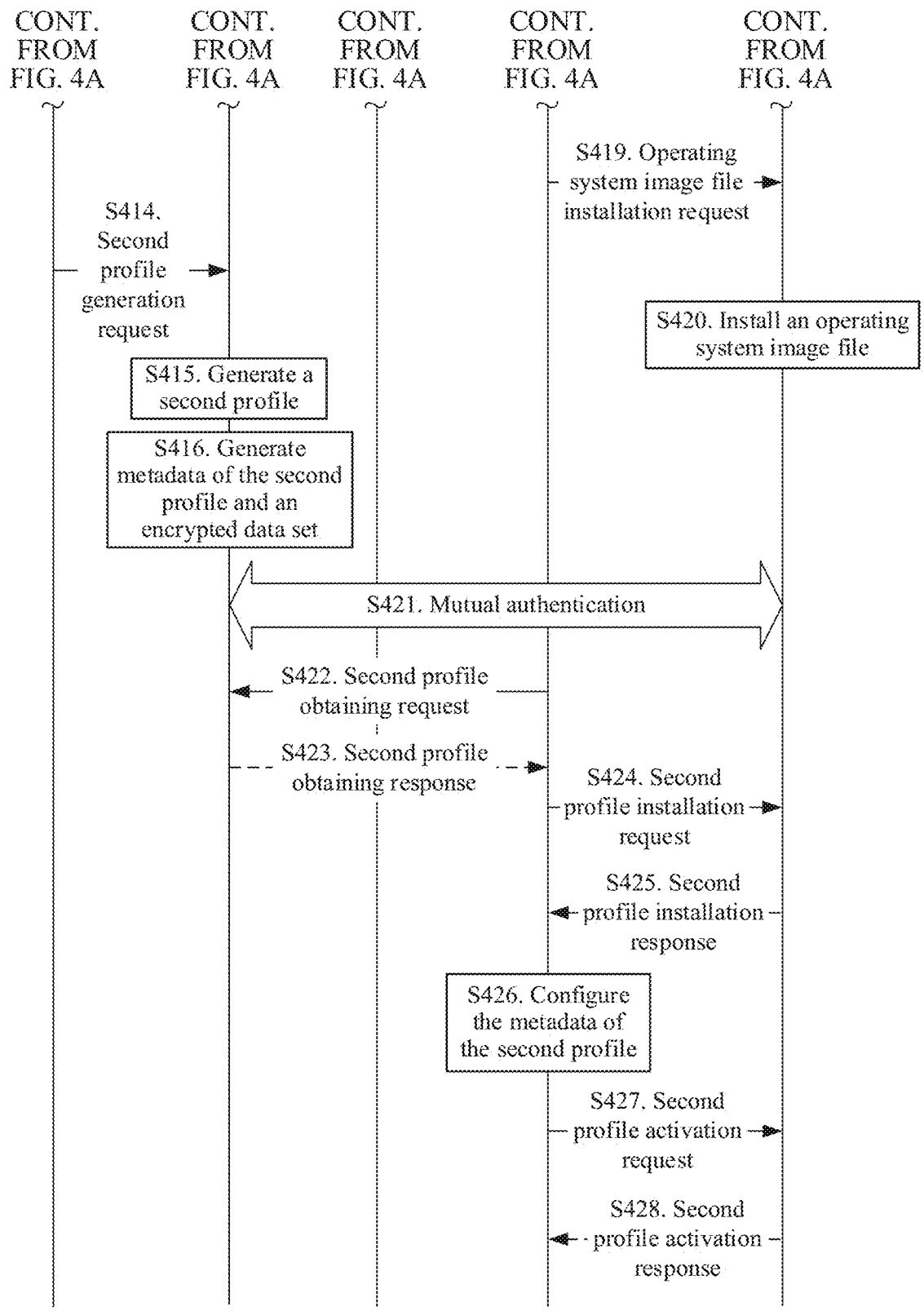

FIG. 4A and FIG. 4B are a schematic flowchart of a second eUICC management method according to an embodiment of the present invention. UE 110, an SM-DS 120, an SM-DP+ 130, and an MNO 150 are included in FIG. 4A and FIG. 4B. As shown in FIG. 4A and FIG. 4B, the profile management method may include the following steps.

S401. The MNO 150 notifies the SM-DP+ 130 that an operating system of an eUICC needs to be updated.

Specifically, when the MNO 150 determines that the operating system of the eUICC needs to be updated, the MNO 150 notifies the SM-DP+ 130 that the operating system of the eUICC needs to be updated. The MNO 150 may instruct the SM-DP+ 130 by invoking a function send REM command to register a remote eUICC management (Remote eUICC Management, REM) operating system update event with the SM-DS 120.

S402. The SM-DP+ 130 registers the operating system update event with the SM-DS 120.

S403. The SM-DS 120 stores the operating system update event.

S404. An LPA queries a remote eUICC management event package.

The LPA can trigger querying of the REM package by a user or automatically trigger querying of the REM packet.

In an example, the LPA may provide a user interface for the user. The user chooses, by using an eUICC management application interface, to update the operating system of the eUICC, for example, the user taps or touches a shortcut for updating the operating system of the eUICC to trigger the LPA to query the REM package, so as to determine whether the SM-DS 120 stores a to-be-processed event related to the eUICC, for example, the operating system update event.

In another example, the LPA may automatically trigger querying of the REM package based on a preset condition, for example, the LPA is triggered to query the REM package when the eUICC is started, so as to determine whether the SM-DS 120 stores a to-be-processed event related to the eUICC, for example, the operating system update event. The LPA may also automatically trigger querying of the REM package based on a preset time interval. For example, the LPA triggers querying of the REM package at a predetermined time in each week or month. It may be understood that the preset time interval or the predetermined time may be determined based on an actual requirement. This is not limited in this application.

S405. The LPA sends an address obtaining request of the SM-DP+ 130 to the SM-DS 120.

The LPA may send a polling address (Polling address) obtaining request to the eUICC, so as to obtain a polling address of the eUICC. The LPA sends the polling address obtaining request by invoking a function Get Polling address. After receiving the polling address obtaining request, the eUICC sends the polling address to the LPA. Then, the LPA sends the address obtaining request of the SM-DP+ 130 to the SM-DS 120. After receiving the address obtaining request of the SM-DP+ 130, the SM-DS 120 sends, to the LPA, an address of the SM-DP+ 130 corresponding to the polling address.

S406. The LPA sends a REM package obtaining request to the SM-DP+ 130.

After receiving the address of the SM-DP+ 130 sent by the SM-DS 120, the LPA sends the REM package obtaining request to the SM-DP+ 130 corresponding to the address of the SM-DP+ 130, and searches the SM-DP+ 130 for the REM package. The LPA may send the REM package obtaining request by invoking a function Retrieve REM package command.

S407. The LPA parses and verifies the REM package.

After receiving the REM package sent by the SM-DP+ 130, the LPA may parse the REM package, and verify authenticity of the REM package. The LPA may parse and verify the REM package in an agreed encryption/decryption manner. Details are not described herein again.

S408. The LPA sets an operating system update flag.

S409. The LPA obtains metadata of a first profile of the eUICC.

S410. The eUICC performs mutual authentication with the SM-DP+ 130.

S411. The LPA obtains an updated operating system image file from the SM-DP+ 130.

S412. The SM-DP+ 130 sends an operating system download progress notification to the MNO 150.

S413. The MNO 150 determines, based on the operating system update flag, whether a profile needs to be re-downloaded in the eUICC.

S414. The MNO 150 sends a second profile generation request to the SM-DP+ 130.

S415. The SM-DP+ 130 generates a second profile.

S416. The SM-DP+ 130 generates metadata of the second profile and an encrypted data set.

S417. The LPA sends the first profile and a metadata deletion request to the eUICC.

S418. The eUICC deletes the first profile and the metadata.

S419. The LPA sends an operating system image file installation request to the eUICC.

S420. The eUICC installs an operating system image file.

S421. The eUICC performs mutual authentication with a corresponding SM-DP+ based on an address of a default SM-DP+.

S422. The LPA sends a second profile obtaining request to the SM-DP+ 130.

S423. The SM-DP+ 130 sends a second profile obtaining response to the LPA.

S424. The LPA sends a second profile installation request to the eUICC.

S425. The eUICC sends a second profile installation response to the LPA.

S426. The LPA configures the metadata of the second profile.

S427. The LPA sends a second profile activation request to the eUICC.

S428. The eUICC sends a second profile activation response to the LPA.

In this embodiment of the present invention, specific implementations of steps S402, S403, and S408 to S428 are the same as the specific implementations of steps S302, S303, and S307 to S327 described above, and details are not described herein again.

According to the eUICC profile management method provided in this embodiment of the present invention, when the operating system of the eUICC needs to be updated, the LPA sets the operating system update flag, and obtains and stores the metadata of the first profile. The profile server generates the second profile based on the operating system update flag, generates the metadata of the second profile. The LPA configures the metadata of the second profile based on the metadata of the first profile, and activates the second profile based on the configured metadata of the second profile, so that after completing upgrade of the operating system of the eUICC, the user can normally use an operator service without configuring a profile again, thereby simplifying a configuration process of the profile, and improving intention of the user to update the operating system of the eUICC and user experience.

Figure 5A:
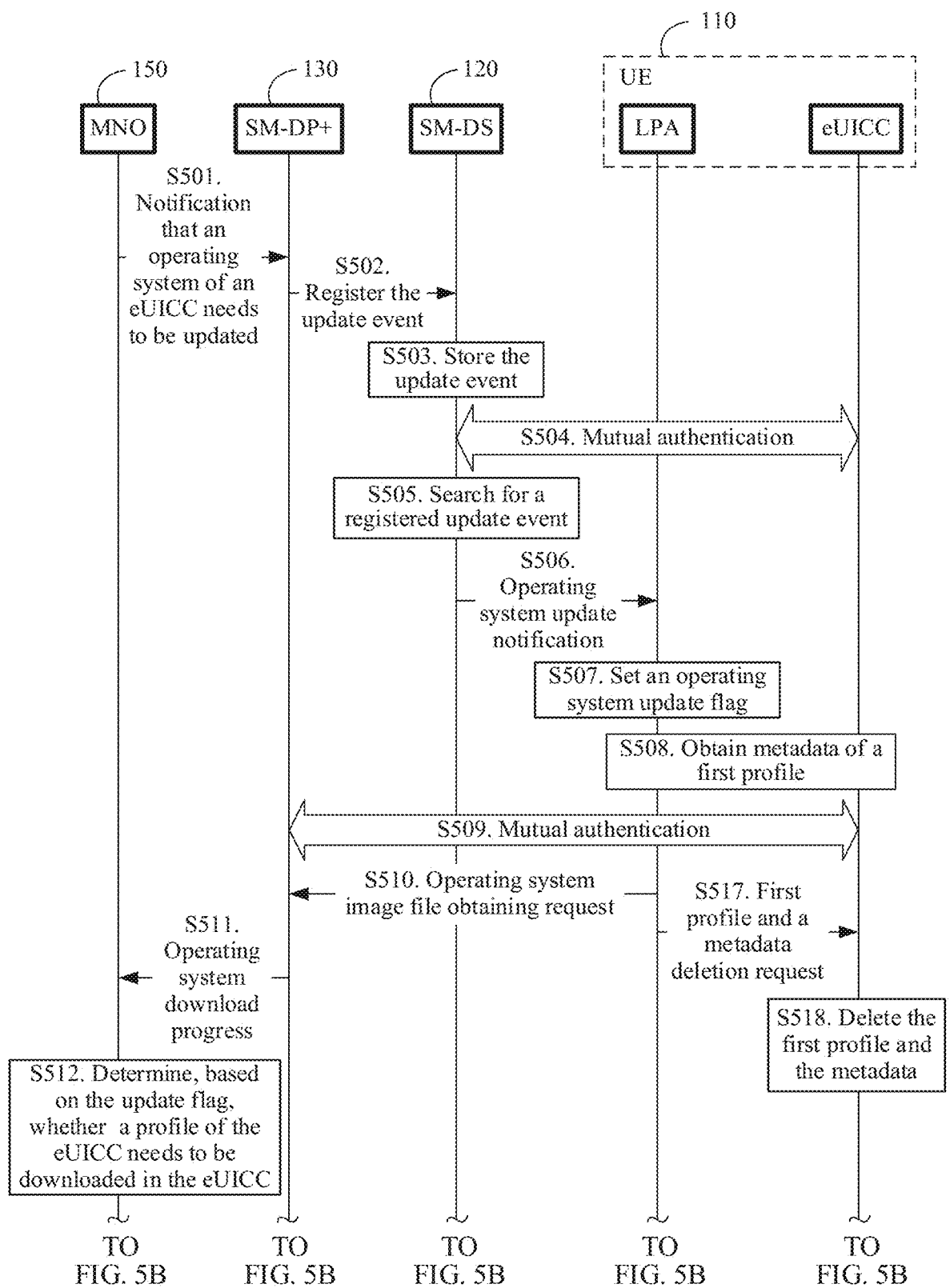
FIG. 5A and FIG. 5B are a schematic flowchart of a third eUICC profile management method according to an embodiment of the present invention.
Figure 5B:
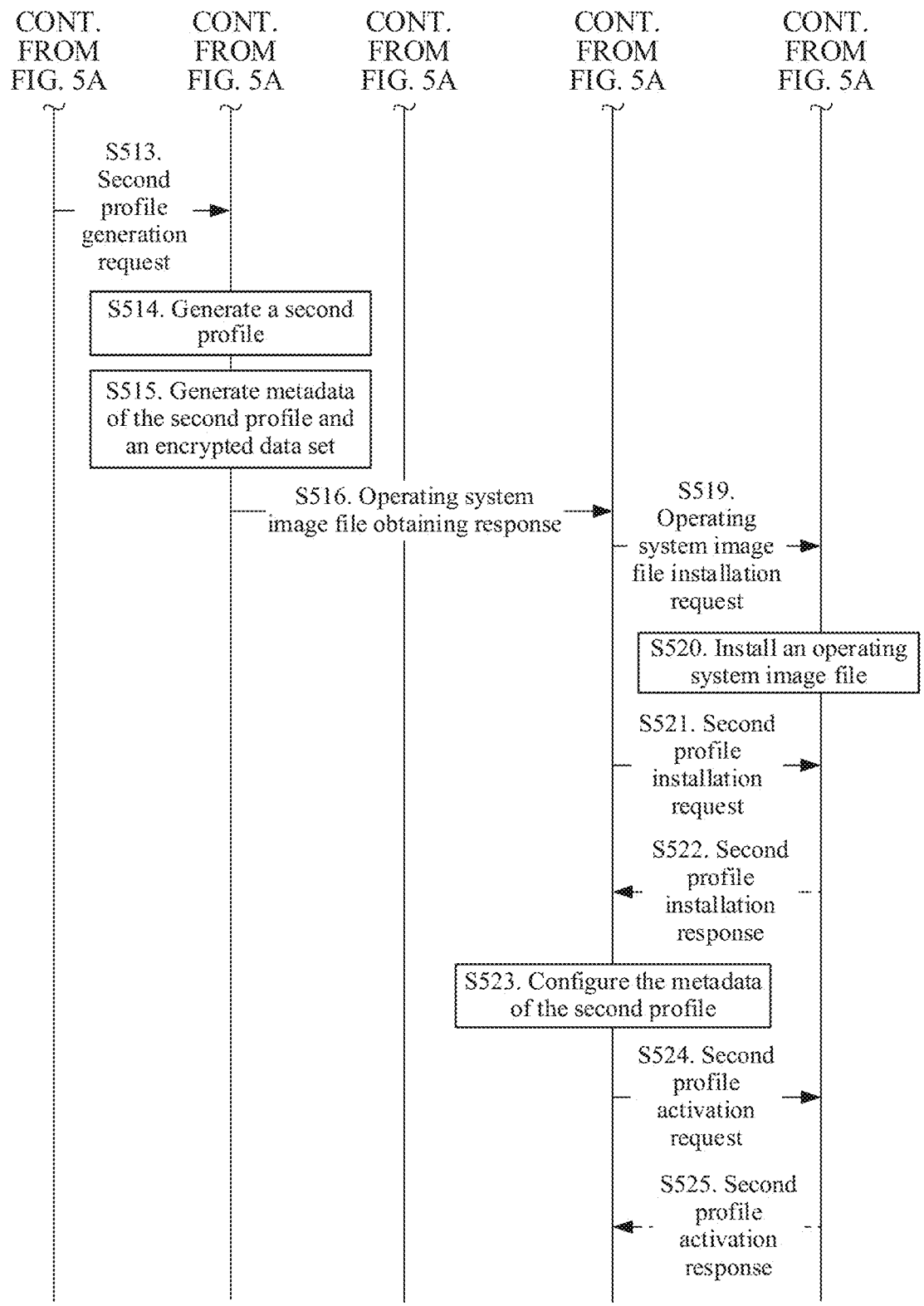

FIG. 5A and FIG. 5B are a schematic flowchart of a third eUICC profile management method according to an embodiment of the present invention. UE 110, an SM-DS 120, an SM-DP+ 130, and an MNO 150 are included in FIG. 5A and FIG. 5B. As shown in FIG. 5A and FIG. 5B, the eUICC profile management method may include the following steps.

S501. The MNO 150 notifies the SM-DP+ 130 that an operating system of an eUICC needs to be updated.

S502. The SM-DP+ 130 registers the update event with the SM-DS 120.

S503. The SM-DS 120 stores the update event.

S504. The eUICC performs mutual authentication with the SM-DS 120.

S505. The SM-DS 120 searches for a registered operating system update event.

S506. The SM-DS 120 sends an operating system update notification to an LPA.

S507. The LPA sets an operating system update flag.

S508. The LPA obtains metadata of a first profile of the eUICC.

S509. The eUICC performs mutual authentication with the SM-DP+ 130.

S510. The LPA sends an operating system image file obtaining request to the SM-DP+ 130.

After the eUICC and the SM-DP+ 130 complete the mutual authentication, or when the LPA determines that a secure channel established between the eUICC and the SM-DP+ 130 through mutual authentication is not closed, the LPA sends the operating system image file obtaining request to the SM-DP+ 130. The operating system image file obtaining request may include an EID, an ICCID, the metadata of the first profile, and an operating system update flag.

After receiving the operating system image file obtaining request, the SM-DP+ 130 prepares an updated operating system image file based on the operating system image file obtaining request. For example, the SM-DP+ 130 may query, based on the EID and the ICCID, an operating system image file of the eUICC corresponding to the parameters.

Optionally, after receiving the operating system image file obtaining request, the SM-DP+ 130 may determine, based on the operating system update flag in the operating system image file obtaining request, whether a profile needs to be re-downloaded in the eUICC.

In an example, when a value of the operating system update flag is 1, the SM-DP+ 130 may determine that a second profile needs to be re-downloaded in the eUICC because of updating of the operating system. When the value of the operating system update flag is 0, the SM-DP+ 130 may determine that the second profile does not need to be re-downloaded because the operating system of the eUICC is not updated.

In another example, when the operating system update flag includes operating system update text information, the SM-DP+ 130 parses the text information in the operating system update flag, so as to determine whether the profile needs to be re-downloaded in the eUICC.

It should be noted that when the SM-DP+ 130 determines, based on the operating system update flag, whether the profile needs to be re-downloaded in the eUICC, steps S511 to S513 may be skipped, and step S514 may be directly performed.

S511. The SM-DP+ 130 sends an operating system download progress notification to the MNO 150.

S512. The MNO 150 determines, based on the operating system update flag, whether a profile needs to be re-downloaded in the eUICC.

S513. The MNO 150 sends a second profile generation request to the SM-DP+ 130.

S514. The SM-DP+ 130 generates a second profile.

S515. The SM-DP+ 130 generates metadata of the second profile and an encrypted data set.

S516. The SM-DP+ 130 sends an operating system image file obtaining response to the LPA.

The SM-DP+ 130 sends the operating system image file obtaining response to the LPA. The operating system image file obtaining response may include the updated operating system image file, the second profile, and the metadata of the second profile. Alternatively, the operating system image file obtaining response may include an indication message, and the indication message is used to instruct the LPA to download the operating system image file, the second profile, and the metadata of the second profile from the SM-DP+ 130.

Before sending the operating system image file obtaining response to the LPA, the SM-DP+ 130 may perform mutual authentication with the eUICC, or determine whether a secure channel established between the eUICC and the SM-DP+ 130 through mutual authentication is closed. After the mutual authentication is completed, or when the SM-DP+ 130 determines that the secure channel established between the eUICC and the SM-DP+ 130 by using the mutual authentication is not closed, the SM-DP+ 130 sends the encrypted data set (smdpsigned2) to the LPA. After receiving the encrypted data set (smdpsigned2), the LPA instructs, by invoking a function PrepareDownload, the eUICC to prepare to download the operating system image file, the second profile, and the metadata of the second profile. Specifically, the function carries the smdpsigned2. The eUICC generates a temporary session key pair, decrypts the smdpsigned2 by using the session key pair generates another encrypted data set (eUICCsigned2), and then generates an eUICC signature (eUICCSignature) based on the eUICCsigned2. The eUICC signature is used to verify correctness of eUICCsigned2 content. If the eUICCsigned2 content is correct through a check of the eUICC signature, it indicates that verification succeeds.

The SM-DP+ 160 receives a notification message that is sent by the LPA and that indicates that the operating system image file, the second profile, and the metadata of the second profile can be downloaded. The notification message may include parameters such as the EID, the ICCID, the operating system update flag, the eUICCsigned2, and the eUICCSignature. The SM-DP+ 160 decrypts the received eUICCsigned2, and verifies the decrypted eUICCsigned2. If it is found that the content of the decrypted eUICCsigned2 is correct, verification of the eUICCsigned2 succeeds. The SM-DP+ 130 checks the ICCID of the second profile. Because the ICCID is an identity of the second profile, the SM-DP+ 130 can verify, by checking whether the ICCID matches the second profile, whether the second profile is the profile needs to be downloaded in the eUICC. The SM-DP+ 130 checks content of the operating system update flag, to determine that the profile needs to be re-downloaded in the eUICC because of updating of the operating system.

After the eUICCsigned2, the ICCID of the second profile, and the operating system update flag are verified, the SM-DP+ 130 encrypts the operating system image file, the second profile, and the metadata of the second profile to generate an encryption profile package (bound profile package), and sends the encryption profile package to the LPA.

S517. The LPA sends the first profile and a metadata deletion request to the eUICC.

S518. The eUICC deletes the first profile and the metadata.

It should be noted that steps S517 and S518 may be performed simultaneously with steps S511 to S516, or may be performed successively. For example, after steps S511 to S516 are completed, steps S517 and S518 are performed. Alternatively, after steps S517 and S518 are completed, steps S511 to S516 are performed. Optionally, steps S517 and S518 may alternatively be performed after step S508.

S519. The LPA sends an operating system image file installation request to the eUICC.

S520. The eUICC installs an operating system image file.

S521. The LPA sends a second profile installation request to the eUICC.

S522. The eUICC sends a second profile installation response to the LPA.

S523. The LPA configures the metadata of the second profile.

S524. The LPA sends a second profile activation request to the eUICC.

S525. The eUICC sends a second profile activation response to the LPA.

In this embodiment of the present invention, specific implementations of steps S501 to S509, S511 to S515, and S517 to S525 are the same as the specific implementations of steps S301 to S309, S311 to S319, and S323 to S327 described above, and details are not described herein again.

According to the eUICC profile management method provided in this embodiment of the present invention, when the operating system of the eUICC needs to be updated, the LPA sets the operating system update flag, and obtains and stores the metadata of the first profile. The profile server generates the second profile based on the operating system update flag, generates the metadata of the second profile. The LPA configures the metadata of the second profile based on the metadata of the first profile, and activates the second profile based on the configured metadata of the second profile, so that after completing upgrade of the operating system of the eUICC, a user can normally use an operator service without configuring a profile again, thereby simplifying a configuration process of the profile, and improving intention of the user to update the operating system of the eUICC and user experience.

Figure 6:
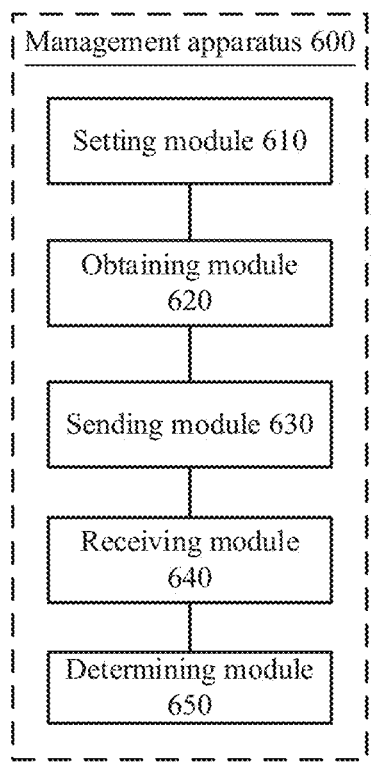
FIG. 6 is a schematic diagram of a component structure of a first eUICC profile management apparatus according to an embodiment of the present invention.

FIG. 6 is a schematic structural diagram a first eUICC profile management apparatus 600 according to an embodiment of the present invention. As shown in FIG. 6, the management apparatus 600 may include a setting module 610, an obtaining module 620, a sending module 630, and a receiving module 640.

The setting module 610 is configured to: when an operating system of the eUICC needs to be updated, set an operating system update flag and obtain metadata of a first profile, where the operating system update flag is used to identify that the eUICC is in an update status.

The obtaining module is 620 configured to obtain the metadata of the first profile, where the metadata of the first profile is used to indicate status information of the first profile of the eUICC.

The sending module 630 is configured to send a profile obtaining request to a profile server, where the profile obtaining request includes an eUICC identifier, a profile identifier, and the operating system update flag.

The receiving module 640 is configured to: receive the second profile sent by the profile server, and install the second profile in the eUICC.

The setting module 610 is further configured to: configure metadata of the second profile based on the metadata of the first profile; and activate the second profile based on the metadata of the second profile.

Optionally, the obtaining module 620 is further configured to obtain the eUICC identifier and a first profile identifier.

Optionally, the receiving module 640 is further configured to download the operating system of the eUICC based on the eUICC identifier, the first profile identifier, and the operating system update flag.

Optionally, the receiving module 640 is further configured to receive the metadata of the second profile.

Optionally, the management apparatus 600 further includes a determining module 650, and the determining module 650 is configured to determine, based on the operating system update flag, that the second profile is a profile that needs to be downloaded in the eUICC.

Optionally, the setting module 610 is configured to replace the metadata of the second profile with the metadata of the first profile. Alternatively, the setting module 610 is configured to: when field content of the metadata of the first profile is different from field content of the metadata of the second profile, replace the field content of the second profile with the field content of the first profile.

Optionally, the obtaining module 620 is further configured to obtain an address of the profile server.

It may be understood that functions of the function modules of the management apparatus in this embodiment of the present invention may be implemented by using steps of the method embodiments shown in FIG. 3A and FIG. 3B to FIG. 5A and FIG. 5B. For a specific implementation process, refer to related descriptions of the foregoing method embodiments. Details are not described herein again.

According to the eUICC profile management apparatus provided in this embodiment of the present invention, when the operating system of the eUICC needs to be updated, an LPA sets the operating system update flag, and obtains and stores the metadata of the first profile. The profile server generates the second profile based on the operating system update flag, generates the metadata of the second profile. The LPA configures the metadata of the second profile based on the metadata of the first profile, and activates the second profile based on the configured metadata of the second profile, so that after completing upgrade of the operating system of the eUICC, a user can normally use an operator service without configuring a profile again, thereby simplifying a configuration process of the profile, and improving intention of the user to update the operating system of the eUICC and user experience.

Figure 7:
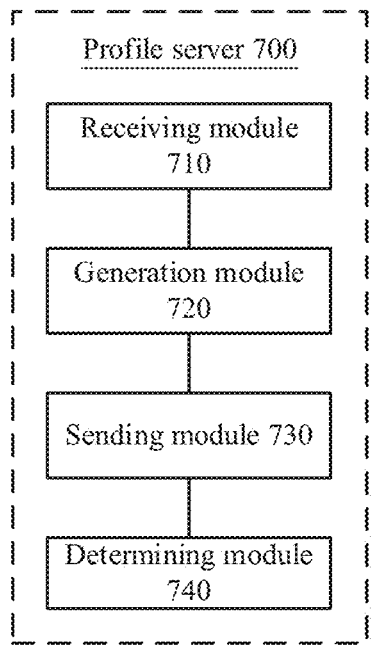
FIG. 7 is a schematic diagram of a component structure of a first profile server according to an embodiment of the present invention.

FIG. 7 is a schematic diagram of a component structure of a first profile server according to an embodiment of the present invention. As shown in FIG. 7, the profile server 700 may include a receiving module 710, a generation module 720, and a sending module 730.

The receiving module 710 is configured to: when an operating system of the eUICC needs to be updated, receive a profile obtaining request sent by a local profile assistant LPA, where the profile obtaining request includes an eUICC identifier, a profile identifier, and an operating system update flag, and the operating system update flag is used to identify that the eUICC is in an update status.

The generation module 720 is configured to generate a second profile based on the profile obtaining request.

The sending module 730 is configured to send the second profile to the LPA.

Optionally, the generation module 720 is further configured to generate metadata of the second profile.

Optionally, the sending module 730 is further configured to send the second profile and the metadata of the second profile to the LPA.

Optionally, the profile server 700 may further include a determining module 740. The determining module 740 is configured to determine, based on the operating system update flag, whether the second profile needs to be generated; and the generation module 720 is further configured to: when the second profile needs to be generated, generate the second profile based on the profile obtaining request.

It may be understood that functions of the function modules of the management apparatus in this embodiment of the present invention may be implemented by using steps of the method embodiments shown in FIG. 3A and FIG. 3B to FIG. 5A and FIG. 5B. For a specific implementation process, refer to related descriptions of the foregoing method embodiments. Details are not described herein again.

The eUICC profile server provided in this embodiment of the present invention may include at least one of an SM-DS 120, an SM-DP+ 130, and an MNO 150. The profile server may generate a profile profile required for accessing a corresponding operator network server by the eUICC, and send the profile to the eUICC.

According to the eUICC profile management apparatus provided in this embodiment of the present invention, when the operating system of the eUICC needs to be updated, the LPA sets the operating system update flag, and obtains and stores the metadata of the first profile. The profile server generates the second profile based on the operating system update flag, generates the metadata of the second profile. The LPA configures the metadata of the second profile based on the metadata of the first profile, and activates the second profile based on the configured metadata of the second profile, so that after completing upgrade of the operating system of the eUICC, a user can normally use an operator service without configuring a profile again, thereby simplifying a configuration process of the profile, and improving intention of the user to update the operating system of the eUICC and user experience.

Figure 8:
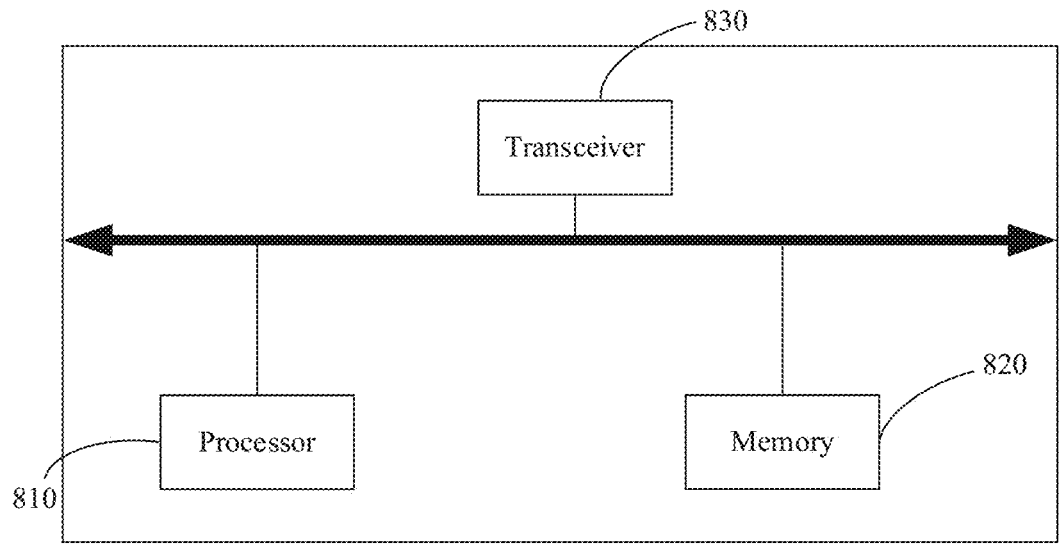
FIG. 8 is a schematic diagram of a component structure of a second eUICC profile management apparatus according to an embodiment of the present invention.

FIG. 8 is a schematic structural diagram of a second eUICC profile management apparatus according to an embodiment of the present invention. As shown in FIG. 8, the management apparatus may include a processor 810, a memory 820, and a transceiver 830.

The processor 810 may be a central processing unit (central processing unit, CPU), or a combination of a CPU and a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 820 is configured to store various applications, operating systems, and data. The memory 820 may transmit the stored data to the processor 810. The memory 820 may include a volatile memory such as a nonvolatile random access memory (nonvolatile random access memory, NVRAM), a phase change random access memory (phase change RAM, PRAM), or a magnetoresistive random access memory (magnetoresistive RAM, MRAM), or may include a nonvolatile memory such as at least one magnetic disk storage device, an electrically erasable programmable read-only memory (electrically erasable programmable read-only memory, EEPROM), a flash memory device such as a NOR flash memory (NOR flash memory) or a NAND flash memory (NAND flash memory), a semiconductor such as a solid state disk (solid state disk, SSD), or the like. The memory 820 may include a combination of the foregoing types of memories.

It may be understood that the memory 820 may be integrated into the processor 810, or may exist independently.

Operation processes of the components are as follows:

The processor 810 is configured to: when an operating system of the eUICC needs to be updated, set an operating system update flag and obtain metadata of a first profile, where the operating system update flag is used to identify that the eUICC is in an update status; and obtain the metadata of the first profile, where the metadata of the first profile is used to indicate status information of the first profile of the eUICC.

The transceiver 830 is configured to: send a profile obtaining request to a profile server, where the profile obtaining request includes an eUICC identifier, a profile identifier, and the operating system update flag; and receive the second profile sent by the profile server, and install the second profile in the eUICC.

The processor 810 is further configured to: configure metadata of the second profile based on the metadata of the first profile; and activate the second profile based on the metadata of the second profile.

Optionally, the processor 810 is further configured to obtain the eUICC identifier and a first profile identifier.

Optionally, the transceiver 830 is further configured to download the operating system of the eUICC based on the eUICC identifier, the first profile identifier, and the operating system update flag.

Optionally, the transceiver 830 is further configured to receive the metadata of the second profile.

Optionally, the processor 810 is further configured to determine, based on the operating system update flag, that the second profile is a profile that needs to be downloaded in the eUICC.

Optionally, the processor 810 is further configured to replace the metadata of the second profile with the metadata of the first profile.

Optionally, the processor 810 is further configured to: when field content of the metadata of the first profile is different from field content of the metadata of the second profile, replace the field content of the second profile with the field content of the first profile.

Optionally, the processor 810 is further configured to obtain an address of the profile server.

It may be understood that functions of the function modules of the management apparatus in this embodiment of the present invention may be implemented by using steps of the method embodiments shown in FIG. 3A and FIG. 3B to FIG. 5A and FIG. 5B. For a specific implementation process, refer to related descriptions of the foregoing method embodiments. Details are not described herein again.

The eUICC profile management apparatus provided in this embodiment of the present invention may be disposed in a terminal (Terminal), for example, may be an LPA in the terminal. The terminal may also be referred to as a system, a subscriber unit, a subscriber station, a mobile station, a mobile console, a remote station, a remote terminal, a mobile device, a user terminal, a mobile terminal, a wireless communications device, a user agent, a user apparatus, or user equipment (User Equipment, UE). For example, the terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device that has a wireless communications function, a computing device, an in-vehicle communications module, a smart meter, a smart home device, or another processing device that is connected to a wireless modem.

According to the eUICC profile management apparatus provided in this embodiment of the present invention, when the operating system of the eUICC needs to be updated, the LPA sets the operating system update flag, and obtains and stores the metadata of the first profile. The profile server generates the second profile based on the operating system update flag, generates the metadata of the second profile. The LPA configures the metadata of the second profile based on the metadata of the first profile, and activates the second profile based on the configured metadata of the second profile, so that after completing upgrade of the operating system of the eUICC, a user can normally use an operator service without configuring a profile again, thereby simplifying a configuration process of the profile, and improving intention of the user to update the operating system of the eUICC and user experience.

Figure 9:
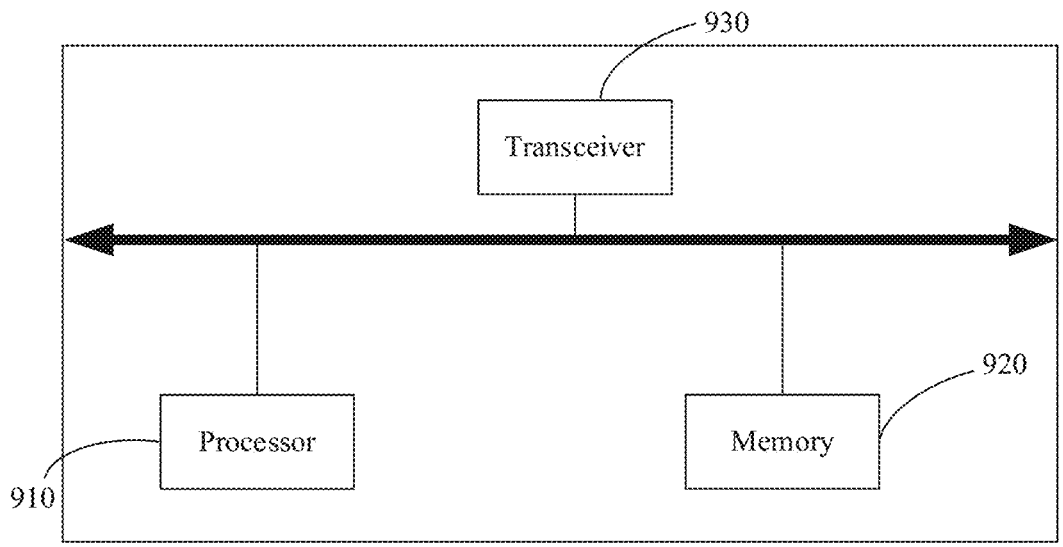
FIG. 9 is a schematic diagram of a component structure of a second profile server according to an embodiment of the present invention.

FIG. 9 is a schematic diagram of a component structure of a second eUICC profile server according to an embodiment of the present invention. As shown in FIG. 9, the profile server may include a processor 910, a memory 920, and a transceiver 930.

The processor 910 may be the processor 810 described above.

The memory 920 may be the memory 820 described above.

It may be understood that the memory 920 may be integrated into the processor 910, or may exist independently.

Operation processes of the components are as follows:

The processor 910 is configured to generate a second profile based on a profile obtaining request.

The transceiver 930 is configured to: when an operating system of the eUICC needs to be updated, receive a profile obtaining request sent by a local profile assistant LPA, where the profile obtaining request includes an eUICC identifier, a profile identifier, and an operating system update flag, and the operating system update flag is used to identify that the eUICC is in an update status.

The transceiver 930 is further configured to send the second profile to the LPA.

Optionally, the processor 910 is further configured to generate metadata of the second profile.

Optionally, the transceiver 930 is further configured to send the second profile and the metadata of the second profile to the LPA.

Optionally, the processor 910 is further configured to determine, based on the operating system update flag, whether the second profile needs to be generated; and when the second profile needs to be generated, generate the second profile based on the profile obtaining request.

It may be understood that functions of the function modules of the management apparatus in this embodiment of the present invention may be implemented by using steps of the method embodiments shown in FIG. 3A and FIG. 3B to FIG. 5A and FIG. 5B. For a specific implementation process, refer to related descriptions of the foregoing method embodiments. Details are not described herein again.

The eUICC profile server provided in this embodiment of the present invention may include at least one of an SM-DS 120, an SM-DP+ 130, and an MNO 150. The profile server may generate a profile profile required for accessing a corresponding operator network server by the eUICC, and send the profile to the eUICC.

According to the eUICC profile server provided in this embodiment of the present invention, when the operating system of the eUICC needs to be updated, the LPA sets the operating system update flag, and obtains and stores the metadata of the first profile. The profile server generates the second profile based on the operating system update flag, generates the metadata of the second profile. The LPA configures the metadata of the second profile based on the metadata of the first profile, and activates the second profile based on the configured metadata of the second profile, so that after completing upgrade of the operating system of the eUICC, a user can normally use an operator service without configuring a profile again, thereby simplifying a configuration process of the profile, and improving intention of the user to update the operating system of the eUICC and user experience.

In the embodiments of the present invention, a communications bus may include a power bus, a control bus, a status signal bus, and the like in addition to a data bus. However, for clear description, various types of buses in the figure are marked as the communications bus.

A person of ordinary skill in the art may be aware that, in combination with the modules, units, algorithms, and steps described in the embodiments of the present invention, the embodiments of the present invention can be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An embedded universal integrated circuit card (eUICC) profile management method implemented by a local profile assistant (LPA), comprising:
    receiving from a mobile network operator (MNO), an operating system update notification;
    setting an operating system update flag indicating that the eUICC is in an update status when an operating system of an eUICC is to be updated;
    obtaining first metadata of a first profile of the eUICC, wherein the first metadata indicates status information of the first profile;
    sending a profile obtaining request to a profile server, wherein the profile obtaining request comprises an eUICC identifier, a profile identifier, and the operating system update flag;
    receiving a second profile from the profile server;
        wherein before receiving the second profile, the eUICC profile management method further comprises downloading:
            the operating system based on the eUICC identifier;
            the first profile identifier; and
            the operating system update flag; and
        installing the second profile in the eUICC;
    configuring second metadata of the second profile based on the first metadata; and
    activating the second profile based on the second metadata.

2. The eUICC profile management method of claim 1, further comprising obtaining the eUICC identifier and a first profile identifier.

3. The eUICC profile management method of claim 1, wherein before configuring the second metadata, the eUICC profile management method further comprises receiving the second metadata.

4. The eUICC profile management method of claim 1, wherein before receiving the second profile, the eUICC profile management method further comprises determining, based on the operating system update flag, that the second profile is to be downloaded in the eUICC.

5. The eUICC profile management method of claim 1, further comprising replacing the second metadata with the first metadata.

6. The eUICC profile management method of claim 1, further comprising:
    identifying that first field content of the first metadata is different from second field content of the second metadata; and
    replacing the second field content with the first field content.

7. The eUICC profile management method of claim 1, wherein before sending the profile obtaining request, the eUICC profile management method further comprises obtaining an address of the profile server.

8. An embedded universal integrated circuit card (eUICC) profile management method implemented by a profile server, comprising:
    sending an eUICC an operating system update notification;
    receiving a profile obtaining request from a local profile assistant (LPA) when an operating system of the eUICC is to be updated, wherein the profile obtaining request comprises an eUICC identifier, a profile identifier, and an operating system update flag, and wherein the operating system update flag identifies that the eUICC is in an update status;
    determining, based on the operating system update flag, whether the second profile is to be generated;
    generating a second profile based on the profile obtaining request when the second profile is to be generated; and
    sending the second profile to the LPA.

9. The eUICC profile management method of claim 8, wherein after generating the second profile, the eUICC profile management method further comprises generating metadata of the second profile.

10. The eUICC profile management method of claim 9, further comprising sending the second profile and the metadata of the second profile to the LPA.

11. An embedded universal integrated circuit card (eUICC) profile management apparatus, comprising:
    a processor configured to:
        receive from a mobile network operator (MNO), and operating system update notification;
        set an operating system update flag indicating that the eUICC is in an update status; and
        obtain first metadata of a first profile of the eUICC, wherein the first metadata indicates status information of the first profile; and
    a transceiver coupled to the processor and configured to:
        send a profile obtaining request to a profile server, wherein the profile obtaining request comprises an eUICC identifier, a profile identifier, and the operating system update flag; and
        receive a second profile from the profile server, wherein before receiving the second profile, the transceiver is configured to download:
            the operating system based on the eUICC identifier;
            the first profile identifier; and
            the operating system update flag; and
    wherein the processor is further configured to:
        install the second profile in the eUICC;
        configure second metadata of the second profile based on the first metadata; and
        activate the second profile based on the second metadata.

12. The eUICC profile management apparatus of claim 11, wherein the processor is further configured to obtain the eUICC identifier and a first profile identifier.

13. The eUICC profile management apparatus of claim 11, wherein the processor is further configured to:
    identify that first field content of the first metadata is different from second field content of the second metadata; and
    replace the second field content with the first field content.

14. The eUICC profile management apparatus of claim 11, wherein the processor is further configured to obtain an address of the profile server.

15. The eUICC profile management apparatus of claim 11, wherein the transceiver is further configured to receive the second metadata.

16. The eUICC profile management apparatus of claim 11, wherein the processor is further configured to replace the second metadata with the first metadata.

17. The eUICC profile management apparatus of claim 11, wherein before receiving the second profile, the processor is further configured to determine, based on the operating system update flag, that the second profile is to be downloaded in the eUICC.

\* \* \* \* \*